(12) United States Patent
Chittar

(10) Patent No.: US 9,600,497 B2
(45) Date of Patent: *Mar. 21, 2017

(54) IMAGE-BASED INDEXING IN A NETWORK-BASED MARKETPLACE

(71) Applicant: PayPal, Inc., San Jose, CA (US)

(72) Inventor: Naren Chittar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,809

(22) Filed: Aug. 29, 2014

(65) Prior Publication Data

US 2014/0372449 A1    Dec. 18, 2014

Related U.S. Application Data

(63) Continuation of application No. 12/406,016, filed on Mar. 17, 2009, now Pat. No. 8,825,660.

(51) Int. Cl.
  *G06F 7/00*      (2006.01)
  *G06F 17/30*     (2006.01)
(52) U.S. Cl.
  CPC .............. *G06F 17/30259* (2013.01)
(58) Field of Classification Search
  CPC ......... G06F 17/30259; G06F 17/30256; G06F 17/30244; G06F 17/30805; G06F 17/30271; G06F 17/30831; G06F 17/3087
  (Continued)

(56) References Cited

U.S. PATENT DOCUMENTS 5,068,723 A * 11/1991 Dixit et al. ................ 348/420.1
5,546,475 A    8/1996 Bolle et al.
(Continued)

FOREIGN PATENT DOCUMENTS

AU    2009251885 B2    9/2013
CN       1871602 A     11/2006
(Continued)

OTHER PUBLICATIONS

"U.S. Appl. No. 12/058,827, Final Office Action mailed Nov. 23, 2010", 23 pgs.
(Continued)

*Primary Examiner* — Mohammed R Uddin
(74) *Attorney, Agent, or Firm* — Maschoff Brennan

(57) ABSTRACT

A method and system to index and search item listings in a network-based publication system, such as a network-based marketplace. For example, a listing query may be received from a user, the listing query including a query image. The query image may then be processed to generate a plurality of index sets. Each index set of the plurality of index sets may correspond to a respective portion of the query image and may comprise a set of index values. Each index value of the set of index values may be indicative of an image attribute, such as light intensity, for a respective sub-portion of the corresponding portion of the query image. At least one result image from a database of listing images may be identified by comparing the plurality of index sets for the query image to pre-compiled index sets in an index database. Each pre-compiled index set may be associated with at least one listing image which, in turn, may be associated with an item listing on a network-based marketplace.

20 Claims, 11 Drawing Sheets

(58) Field of Classification Search
USPC .................. 707/711, 718, 696, 754, 999.107
See application file for complete search history.

(56) References Cited

U.S. PATENT DOCUMENTS

| | | | |
|---|---|---|---|
| 5,579,471 A | | 11/1996 | Barber et al. |
| 5,692,012 A * | | 11/1997 | Virtamo et al. ............... 375/240 |
| 5,781,899 A * | | 7/1998 | Hirata ........................... 382/305 |
| 5,802,361 A * | | 9/1998 | Wang et al. .................. 382/217 |
| 5,818,964 A * | | 10/1998 | Itoh ................................ 382/205 |
| 5,845,265 A | | 12/1998 | Woolston |
| 5,848,202 A | | 12/1998 | D'Eri et al. |
| 5,870,149 A | | 2/1999 | Comroe et al. |
| 5,889,896 A | | 3/1999 | Meshinsky et al. |
| 5,949,429 A * | | 9/1999 | Bonneau et al. .............. 345/619 |
| 5,979,757 A | | 11/1999 | Tracy et al. |
| 6,058,417 A | | 5/2000 | Hess et al. |
| 6,134,548 A | | 10/2000 | Gottsman |
| 6,157,435 A | | 12/2000 | Slater et al. |
| 6,216,133 B1 | | 4/2001 | Masthoff et al. |
| 6,216,227 B1 | | 4/2001 | Goldstein et al. |
| 6,266,651 B1 | | 7/2001 | Woolston |
| 6,278,446 B1 | | 8/2001 | Liou et al. |
| 6,282,517 B1 | | 8/2001 | Wolfe et al. |
| 6,292,593 B1 * | | 9/2001 | Nako et al. ................... 382/284 |
| 6,359,270 B1 | | 3/2002 | Bridson |
| 6,366,696 B1 | | 4/2002 | Hertz et al. |
| 6,370,513 B1 | | 4/2002 | Kolawa et al. |
| 6,431,444 B1 | | 8/2002 | Gatto |
| 6,434,530 B1 | | 8/2002 | Sloane et al. |
| 6,463,426 B1 * | | 10/2002 | Lipson .............. G06F 17/30247 |
| 6,477,269 B1 | | 11/2002 | Brechner |
| 6,483,570 B1 | | 11/2002 | Slater et al. |
| 6,484,130 B2 | | 11/2002 | Dwyer et al. |
| 6,512,919 B2 | | 1/2003 | Ogasawara |
| 6,530,521 B1 | | 3/2003 | Henry |
| 6,542,933 B1 | | 4/2003 | Durst, Jr. et al. |
| 6,549,913 B1 | | 4/2003 | Murakawa |
| 6,563,959 B1 | | 5/2003 | Troyanker |
| 6,587,835 B1 | | 7/2003 | Treyz et al. |
| 6,589,290 B1 | | 7/2003 | Maxwell et al. |
| 6,640,214 B1 | | 10/2003 | Nambudiri et al. |
| 6,642,929 B1 * | | 11/2003 | Essafi et al. .................. 345/581 |
| 6,751,352 B1 | | 6/2004 | Baharav et al. |
| 6,763,148 B1 | | 7/2004 | Sternberg et al. |
| 6,766,363 B1 | | 7/2004 | Rothschild et al. |
| 6,847,963 B1 | | 1/2005 | Paclat |
| 6,868,433 B1 | | 3/2005 | Philyaw |
| 6,947,571 B1 | | 9/2005 | Rhoads et al. |
| 6,964,374 B1 | | 11/2005 | Djuknic et al. |
| 6,993,573 B2 | | 1/2006 | Hunter |
| 7,007,076 B1 | | 2/2006 | Hess et al. |
| 7,022,281 B1 | | 4/2006 | Senff |
| 7,023,441 B2 * | | 4/2006 | Choi et al. ..................... 345/441 |
| 7,027,652 B1 | | 4/2006 | I'Anson |
| 7,130,466 B2 | | 10/2006 | Seeber |
| 7,257,268 B2 * | | 8/2007 | Eichhorn et al. ............. 382/253 |
| 7,281,018 B1 | | 10/2007 | Begun et al. |
| 7,347,373 B2 | | 3/2008 | Singh |
| 7,363,252 B2 | | 4/2008 | Fujimoto |
| 7,373,317 B1 | | 5/2008 | Kopelman et al. |
| 7,444,388 B1 | | 10/2008 | Svendsen |
| 7,460,735 B1 | | 12/2008 | Rowley et al. |
| 7,478,113 B1 | | 1/2009 | De Spiegeleer et al. |
| 7,593,602 B2 | | 9/2009 | Stentiford |
| 7,702,185 B2 | | 4/2010 | Keating et al. |
| 7,779,263 B2 | | 8/2010 | Kanai |
| 7,801,893 B2 | | 9/2010 | Gulli et al. |
| 7,890,386 B1 | | 2/2011 | Reber |
| 7,921,040 B2 | | 4/2011 | Reber |
| 7,933,811 B2 | | 4/2011 | Reber |
| 7,958,012 B2 | | 6/2011 | Hudak et al. |
| 7,991,646 B2 | | 8/2011 | Lewis et al. |
| 7,991,790 B2 | | 8/2011 | Barker et al. |
| 8,086,502 B2 | | 12/2011 | Krishnamurthy et al. |
| 8,130,242 B2 | | 3/2012 | Cohen |
| 8,251,290 B1 | | 8/2012 | Bushman et al. |
| 8,280,782 B1 | | 10/2012 | Talreja et al. |
| 8,321,293 B2 | | 11/2012 | Lewis et al. |
| 8,385,646 B2 * | | 2/2013 | Lang et al. .................... 382/173 |
| 8,521,609 B2 | | 8/2013 | Lewis et al. |
| 8,825,660 B2 | | 9/2014 | Chittar |
| 2001/0007981 A1 | | 7/2001 | Woolston |
| 2001/0035883 A1 | | 11/2001 | Kobayashi |
| 2001/0049636 A1 | | 12/2001 | Hudda et al. |
| 2002/0010941 A1 | | 1/2002 | Johnson |
| 2002/0022994 A1 | | 2/2002 | Miller et al. |
| 2002/0026358 A1 | | 2/2002 | Miller et al. |
| 2002/0042835 A1 | | 4/2002 | Pepin et al. |
| 2002/0049641 A1 | | 4/2002 | Kopelman et al. |
| 2002/0052873 A1 | | 5/2002 | Delgado et al. |
| 2002/0107737 A1 | | 8/2002 | Kaneko et al. |
| 2002/0138374 A1 | | 9/2002 | Jennings et al. |
| 2002/0146176 A1 * | | 10/2002 | Meyers ......................... 382/218 |
| 2002/0165801 A1 | | 11/2002 | Stern et al. |
| 2002/0174026 A1 | | 11/2002 | Pickover et al. |
| 2002/0174035 A1 | | 11/2002 | Stern et al. |
| 2002/0187774 A1 | | 12/2002 | Ritter et al. |
| 2003/0053706 A1 * | | 3/2003 | Hong et al. ................... 382/253 |
| 2003/0083961 A1 | | 5/2003 | Bezos et al. |
| 2003/0126026 A1 | | 7/2003 | Gronberg et al. |
| 2003/0126227 A1 | | 7/2003 | Zimmerman et al. |
| 2003/0147623 A1 * | | 8/2003 | Fletcher ............................. 386/6 |
| 2003/0208409 A1 | | 11/2003 | Mault |
| 2003/0231806 A1 * | | 12/2003 | Troyanker ..................... 382/305 |
| 2004/0001631 A1 | | 1/2004 | Camara et al. |
| 2004/0019643 A1 | | 1/2004 | Zirnstein, Jr. |
| 2004/0057627 A1 | | 3/2004 | Abe et al. |
| 2004/0099741 A1 | | 5/2004 | Dorai et al. |
| 2004/0133927 A1 * | | 7/2004 | Sternberg et al. ............ 725/136 |
| 2004/0158502 A1 | | 8/2004 | Adams et al. |
| 2004/0205286 A1 | | 10/2004 | Bryant et al. |
| 2004/0262391 A1 | | 12/2004 | Harris et al. |
| 2005/0004838 A1 | | 1/2005 | Perkowski et al. |
| 2005/0010486 A1 | | 1/2005 | Pandhe |
| 2005/0011957 A1 | | 1/2005 | Attia et al. |
| 2005/0044179 A1 | | 2/2005 | Hunter |
| 2005/0055281 A1 | | 3/2005 | Williams |
| 2005/0075945 A1 | | 4/2005 | Hodge et al. |
| 2005/0083413 A1 | | 4/2005 | Reed et al. |
| 2005/0084154 A1 * | | 4/2005 | Li et al. ......................... 382/190 |
| 2005/0131799 A1 | | 6/2005 | Clay et al. |
| 2005/0162419 A1 | | 7/2005 | Kim et al. |
| 2005/0162523 A1 | | 7/2005 | Darrell et al. |
| 2005/0193006 A1 * | | 9/2005 | Bandas ........................ 707/104.1 |
| 2005/0198095 A1 | | 9/2005 | Du et al. |
| 2005/0283379 A1 | | 12/2005 | Reber |
| 2005/0283425 A1 | | 12/2005 | Grove et al. |
| 2006/0006238 A1 | | 1/2006 | Singh |
| 2006/0010042 A1 | | 1/2006 | Gianakis |
| 2006/0011728 A1 | | 1/2006 | Frantz et al. |
| 2006/0013481 A1 * | | 1/2006 | Park et al. ..................... 382/170 |
| 2006/0015492 A1 | | 1/2006 | Keating et al. |
| 2006/0026048 A1 | | 2/2006 | Kolawa et al. |
| 2006/0059116 A1 | | 3/2006 | Levi et al. |
| 2006/0116935 A1 | | 6/2006 | Evans |
| 2006/0120686 A1 | | 6/2006 | Liebenow et al. |
| 2006/0124730 A1 | | 6/2006 | Maloney |
| 2006/0169772 A1 | | 8/2006 | Page et al. |
| 2006/0173747 A1 | | 8/2006 | Gantman et al. |
| 2006/0190350 A1 | | 8/2006 | Maas |
| 2006/0206584 A1 | | 9/2006 | Hyder et al. |
| 2006/0235838 A1 | | 10/2006 | Shan et al. |
| 2006/0240862 A1 | | 10/2006 | Neven |
| 2007/0030364 A1 | | 2/2007 | Obrador et al. |
| 2007/0043757 A1 | | 2/2007 | Benton et al. |
| 2007/0078846 A1 | | 4/2007 | Gulli et al. |
| 2007/0100713 A1 | | 5/2007 | Favero et al. |
| 2007/0118430 A1 | | 5/2007 | Wiseman et al. |
| 2007/0122947 A1 | | 5/2007 | Sakurai et al. |
| 2007/0133947 A1 * | | 6/2007 | Armitage et al. ............... 386/95 |
| 2007/0138289 A1 | | 6/2007 | Melick et al. |
| 2007/0143256 A1 | | 6/2007 | Starr et al. |
| 2007/0150403 A1 | | 6/2007 | Mock et al. |

(56) References Cited

U.S. PATENT DOCUMENTS

| | | | |
|---|---|---|---|
| 2007/0172155 A1 | 7/2007 | Guckenberger | |
| 2007/0174243 A1 | 7/2007 | Fritz | |
| 2007/0174341 A1 | 7/2007 | Saripalli et al. | |
| 2007/0230817 A1* | 10/2007 | Kokojima | 382/268 |
| 2008/0004981 A1 | 1/2008 | Gopalpur et al. | |
| 2008/0037877 A1 | 2/2008 | Jia et al. | |
| 2008/0046738 A1 | 2/2008 | Galloway et al. | |
| 2008/0065514 A1 | 3/2008 | Eaton | |
| 2008/0073423 A1 | 3/2008 | Heit et al. | |
| 2008/0082426 A1 | 4/2008 | Gokturk et al. | |
| 2008/0170810 A1 | 7/2008 | Wu et al. | |
| 2008/0177640 A1 | 7/2008 | Gokturk et al. | |
| 2008/0201368 A1 | 8/2008 | Lee et al. | |
| 2008/0205764 A1 | 8/2008 | Iwai et al. | |
| 2008/0240575 A1 | 10/2008 | Panda et al. | |
| 2008/0243878 A1 | 10/2008 | De Spiegeleer et al. | |
| 2008/0243879 A1 | 10/2008 | Gokhale et al. | |
| 2008/0243957 A1 | 10/2008 | Prahlad et al. | |
| 2008/0278778 A1 | 11/2008 | Saino | |
| 2008/0288338 A1 | 11/2008 | Wiseman et al. | |
| 2009/0012878 A1 | 1/2009 | Tedesco et al. | |
| 2009/0028435 A1* | 1/2009 | Wu et al. | 382/190 |
| 2009/0028446 A1* | 1/2009 | Wu et al. | 382/229 |
| 2009/0094260 A1 | 4/2009 | Cheng et al. | |
| 2009/0141932 A1 | 6/2009 | Jones et al. | |
| 2009/0212113 A1 | 8/2009 | Chiu et al. | |
| 2009/0240735 A1 | 9/2009 | Grandhi et al. | |
| 2009/0245638 A1* | 10/2009 | Collier et al. | 382/173 |
| 2009/0248742 A1 | 10/2009 | Krishnamurthy et al. | |
| 2009/0304267 A1 | 12/2009 | Tapley et al. | |
| 2009/0319570 A1 | 12/2009 | Subramanian | |
| 2009/0324100 A1 | 12/2009 | Kletter et al. | |
| 2009/0325554 A1 | 12/2009 | Reber | |
| 2010/0015960 A1 | 1/2010 | Reber | |
| 2010/0015961 A1 | 1/2010 | Reber | |
| 2010/0015962 A1 | 1/2010 | Reber | |
| 2010/0034469 A1* | 2/2010 | Thorpe et al. | 382/218 |
| 2010/0046842 A1* | 2/2010 | Conwell | 382/218 |
| 2010/0114736 A1 | 5/2010 | Lewis et al. | |
| 2010/0131714 A1* | 5/2010 | Chandrasekaran | 711/124 |
| 2010/0171999 A1* | 7/2010 | Namikata et al. | 358/530 |
| 2010/0241650 A1 | 9/2010 | Chittar | |
| 2011/0029334 A1 | 2/2011 | Reber | |
| 2011/0264549 A1 | 10/2011 | Lewis et al. | |
| 2012/0095864 A1 | 4/2012 | Krishnamurthy | |
| 2013/0091030 A1 | 4/2013 | Lewis et al. | |
| 2013/0339197 A1 | 12/2013 | Lewis et al. | |

FOREIGN PATENT DOCUMENTS

| | | |
|---|---|---|
| CN | 102084391 | 6/2011 |
| CN | 102090080 | 6/2011 |
| CN | 104978393 A | 10/2015 |
| EP | 1091587 A2 | 4/2001 |
| EP | 1549025 A1 | 6/2005 |
| EP | 1710717 A1 | 10/2006 |
| EP | 1906316 A1 | 4/2008 |
| JP | 200700172605 | 7/2007 |
| KR | 1020070098058 | 10/2007 |
| KR | 100805607 B1 | 2/2008 |
| KR | 10-1191021 | 10/2012 |
| WO | WO-0103020 A1 | 1/2001 |
| WO | WO-0186501 A1 | 11/2001 |
| WO | WO-2004072762 A2 | 8/2004 |
| WO | WO-2008003966 A1 | 1/2008 |
| WO | WO-2009111047 A2 | 9/2009 |
| WO | WO-2009111047 A3 | 12/2009 |
| WO | WO-2009145822 A1 | 12/2009 |

OTHER PUBLICATIONS

"U.S. Appl. No. 12/058,827, Non-Final Office Action mailed Jul. 28, 2010", 22 pgs.

"U.S. Appl. No. 12/058,827, Notice of Allowance mailed Aug. 22, 2011", 11 pgs.

"U.S. Appl. No. 12/058,827, Response filed Mar. 23, 2011 to Final Office Action mailed Nov. 23, 2010", 13 pgs.

"U.S. Appl. No. 12/058,827, Response filed Oct. 28, 2010 to Non Final Office Action mailed Jul. 28, 2010", 17 pgs.

"U.S. Appl. No. 12/145,313, Advisory Action mailed Feb. 21, 2012", 3 pgs.

"U.S. Appl. No. 12/145,313, Advisory Action mailed Apr. 21, 2011", 3 pgs.

"U.S. Appl. No. 12/145,313, Appeal Brief filed Mar. 18, 2013", 28 pgs.

"U.S. Appl. No. 12/145,313, Decision on Pre-Appeal Brief mailed Jan. 18, 2013", 2 pgs.

"U.S. Appl. No. 12/145,313, Examiner Interview Summary mailed Mar. 1, 2012", 3 pg.

"U.S. Appl. No. 12/145,313, Examiners Answer mailed May 15, 2013", 5 pgs.

"U.S. Appl. No. 12/145,313, Final Office Action mailed Mar. 15, 2011", 36 pgs.

"U.S. Appl. No. 12/145,313, Final Office Action mailed Jul. 11, 2012", 50 pgs.

"U.S. Appl. No. 12/145,313, Final Office Action mailed Dec. 2, 2011", 43 pgs.

"U.S. Appl. No. 12/145,313, Non Final Office Action mailed Mar. 30, 2012", 49 pgs.

"U.S. Appl. No. 12/145,313, Non Final Office Action mailed Jun. 23, 2011", 40 pgs.

"U.S. Appl. No. 12/145,313, Non-Final Office Action mailed Oct. 6, 2010", 32 pgs.

"U.S. Appl. No. 12/145,313, Pre-Appeal Brief Request for Review filed Oct. 11, 2012", 4 pgs.

"U.S. Appl. No. 12/145,313, Reply Brief filed Jul. 15, 2013", 5 pgs.

"U.S. Appl. No. 12/145,313, Response filed Feb. 2, 2012 to Final Office Action mailed Dec. 2, 2011", 17 pgs.

"U.S. Appl. No. 12/145,313, Response filed Mar. 1, 2012 to Advisory Action mailed Feb. 21, 2012 and Final Office Action mailed Dec. 2, 2011", 19 pgs.

"U.S. Appl. No. 12/145,313, Response filed Jun. 15, 2011 to Advisory Action mailed Apr. 21, 2011 abd Final Office Action mailed Mar. 15, 2011", 17 pgs.

"U.S. Appl. No. 12/145,313, Response filed Jul. 2, 2012 to Non Final Office Action mailed Mar. 30, 2011", 14 pgs.

"U.S. Appl. No. 12/145,313, Response filed Sep. 15, 2011 too Non Final Office Action mailed Jun. 23, 2011", 16 pgs.

"U.S. Appl. No. 12/145,313, Response filed Jan. 6, 2011 to Non Final Office Action mailed Oct. 6, 2010", 20 pgs.

"U.S. Appl. No. 12/145,313, Response filed Apr. 8, 2011 to a Final Office Action mailed Mar. 15, 2011", 22 pgs.

"U.S. Appl. No. 12/262,012 Non-Final Office Action mailed Aug. 20, 2010", 14 pgs.

"U.S. Appl. No. 12/262,012, Notice of Allowance mailed Mar. 25, 2011", 13 pgs.

"U.S. Appl. No. 12/262,012, Response filed Dec. 20, 2010 to Non Final Office Action mailed Aug. 20, 2010", 14 pgs.

"U.S. Appl. No. 12/371,882, Examiner Interview Summary mailed Feb. 27, 2012", 3 pgs.

"U.S. Appl. No. 12/371,882, Examiner Interview Summary mailed Nov. 20, 2013", 3 pgs.

"U.S. Appl. No. 12/371,882, Final Office Action mailed Mar. 13, 2013", 24 pgs.

"U.S. Appl. No. 12/371,882, Final Office Action mailed Nov. 14, 2011", 21 pgs.

"U.S. Appl. No. 12/371,882, Final Office Action mailed Dec. 18, 2013", 26 pgs.

"U.S. Appl. No. 12/371,882, Non Final Office Action mailed Jun. 8, 2011", 22 pgs.

"U.S. Appl. No. 12/371,882, Non Final Office Action mailed Aug. 30, 2013", 20 pgs.

"U.S. Appl. No. 12/371,882, Non Final Office Action mailed Oct. 23, 2012", 21 pgs.

"U.S. Appl. No. 12/371,882, Preliminary Amendment filed Feb. 16, 2009", 4 pgs.

(56) References Cited

OTHER PUBLICATIONS

"U.S. Appl. No. 12/371,882, Preliminary Amendment mailed Jun. 15, 2009", 3 pgs.
"U.S. Appl. No. 12/371,882, Response filed Jan. 22, 2013 to Non Final Office Action mailed Oct. 23, 2012", 12 pgs.
"U.S. Appl. No. 12/371,882, Response filed Mar. 14, 2012 to Final Office Action mailed Nov. 14, 2011", 10 pgs.
"U.S. Appl. No. 12/371,882, Response filed May 8, 2014 to Final Office Action mailed Dec. 18, 2013", 12 pgs.
"U.S. Appl. No. 12/371,882, Response filed Jun. 13, 2013 to Final Office Action mailed Mar. 13, 2013", 14 pgs.
"U.S. Appl. No. 12/371,882, Response filed Sep. 8, 2011 to Non Final Office Action mailed Jun. 8, 2011", 13 pgs.
"U.S. Appl. No. 12/371,882, Response filed Dec. 2, 2013 to Non Final Office Action mailed Aug. 30, 2013", 13 pgs.
"U.S. Appl. No. 12/398,957, Appeal Brief filed Oct. 27, 2014", 32 pgs.
"U.S. Appl. No. 12/398,957, Examiner Interview Summary mailed Sep. 10, 2014", 4 pgs.
"U.S. Appl. No. 12/398,957, Final Office Action mailed Jul. 18, 2014", 27 pgs.
"U.S. Appl. No. 12/398,957, Final Office Action mailed Nov. 7, 2012", 22 pgs.
"U.S. Appl. No. 12/398,957, Non Final Office Action mailed Mar. 29, 2012", 23 pgs.
"U.S. Appl. No. 12/398,957, Non Final Office Action mailed Jul. 29, 2011", 23 pgs.
"U.S. Appl. No. 12/398,957, Non Final Office Action mailed Sep. 19, 2013", 21 pgs.
"U.S. Appl. No. 12/398,957, Response filed Jan. 16, 2014 to Non Final Office Action mailed Sep. 19, 2013", 13 pgs.
"U.S. Appl. No. 12/398,957, Response filed Mar. 7, 2013 to Final Office Action mailed Nov. 7, 2012", 12 pgs.
"U.S. Appl. No. 12/398,957, Response filed Jul. 30, 2012 to Non Final Office Action mailed Mar. 29, 2012", 13 pgs.
"U.S. Appl. No. 12/398,957, Response filed Dec. 29, 2011 to Non Final Office Action mailed Jul. 29, 2011", 15 pgs.
"U.S. Appl. No. 12/406,016, Examiner Interview Summary mailed May 15, 2012", 3 pgs.
"U.S. Appl. No. 12/406,016, Final Office Action mailed Feb. 29, 2012", 25 pgs.
"U.S. Appl. No. 12/406,016, Non Final Office Action mailed Jun. 21 2011", 21 pgs.
"U.S. Appl. No. 12/406,016, Non Final Office Action mailed Oct. 2, 2013", 21 pgs.
"U.S. Appl. No. 12/406,016, Notice of Allowability mailed Jun. 11, 2014", 19 pgs.
"U.S. Appl. No. 12/406,016, Notice of Allowance mailed Apr. 28, 2014", 23 pgs.
"U.S. Appl. No. 12/406,016, Notice of Allowance mailed Jun. 11, 2014", 19 pgs.
"U.S. Appl. No. 12/406,016, Response filed Mar. 3, 2014 to Non Final Office Action mailed Oct. 2, 2013", 15 pgs.
"U.S. Appl. No. 12/406,016, Response filed May 17, 2012 to Non Final Office Action mailed Feb. 29, 2012", 16 pgs.
"U.S. Appl. No. 12/406,016, Response filed Sep. 21, 2011 to Non Final Office Action mailed Jun. 21, 2011", 17 pgs.
"U.S. Appl. No. 13/175,641 , Response filed May 7, 2012 to Non Final Office Action mailed Dec. 7, 2011", 9 pgs.
"U.S. Appl. No. 13/175,641, Non Final Office Action mailed Dec. 7, 2011", 10 pgs.
"U.S. Appl. No. 13/175,641, Notice of Allowance mailed Jul. 23, 2012", 7 pgs.
"U.S. Appl. No. 13/333,934, Examiner Interview Summary mailed Apr. 4, 2014", 3 pgs.
"U.S. Appl. No. 13/333,934, Examiner Interview Summary mailed Jun. 28, 2013", 3 pgs.
"U.S. Appl. No. 13/333,934, Final Office Action mailed May 19, 2014", 16 pgs.
"U.S. Appl. No. 13/333,934, Final Office Action mailed Jul. 18, 2013", 16 pgs.
"U.S. Appl. No. 13/333,934, Final Office Action mailed Aug. 15, 2012", 22 pgs.
"U.S. Appl. No. 13/333,934, Non Final Office Action mailed Feb. 28, 2013", 22 pgs.
"U.S. Appl. No. 13/333,934, Non Final Office Action mailed Apr. 26, 2012", 20 pgs.
"U.S. Appl. No. 13/333,934, Non Final Office Action mailed Oct. 3, 2014", 19 pgs.
"U.S. Appl. No. 13/333,934, Non Final Office Action mailed Nov. 21, 2013", 16 pgs.
"U.S. Appl. No. 13/333,934, Response filed Jan. 15, 2013 to Final Office Action mailed Aug. 15, 2012", 13 pgs.
"U.S. Appl. No. 13/333,934, Response filed Mar. 20, 2014 to Non Final Office Action mailed Nov. 21, 2013", 12 pgs.
"U.S. Appl. No. 13/333,934, Response filed Jun. 27, 2013 to Non Final Office Action mailed Feb. 28, 2013", 13 pgs.
"U.S. Appl. No. 13/333,934, Response filed Jul. 26, 2012 to Non Final Office Action mailed Apr. 26, 2012", 13 pgs.
"U.S. Appl. No. 13/333,934, Response filed Aug. 19, 2014 to Final Office Action mailed May 19, 2014", 14 pgs.
"U.S. Appl. No. 13/333,934, Response filed Oct. 18, 2013 to Final Office Action mailed Jul. 18, 2013", 11 pgs.
"U.S. Appl. No. 13/685,406, Notice of Allowance mailed May 1, 2013", 15 pgs.
"U.S. Appl. No. 13/970,736, Preliminary Amendment filed Dec. 3, 2013", 6 pgs.
"Australian Application Serial No. 2009251885, Notice of Acceptance mailed May 13, 2013", 3 pgs.
"Australian Application Serial No. 2009251885, Office Action mailed Apr. 20, 2012", 2 pgs.
"Australian Application Serial No. 2009251885, Response filed Apr. 11, 2013 to First Examiner Report mailed Apr. 20, 2012", 20 pgs.
"Chinese Application Serial No. 200980107871.0, Office Action mailed Feb. 2, 2012", with English translation of claims, 17 pgs.
"Chinese Application Serial No. 200980107871.0, Office Action mailed May 3, 2013", with English translation of claims, 29 pgs.
"Chinese Application Serial No. 200980107871.0, Office Action mailed Jun. 5, 2014", with English translation of claims, 10 pgs.
"Chinese Application Serial No. 200980107871.0, Office Action mailed Nov. 1, 2012", with English translation of claims, 13 pgs.
"Chinese Application Serial No. 200980107871.0, Office Action mailed Nov. 5, 2013", with English translation of claims, 12 pgs.
"Chinese Application Serial No. 200980107871.0, Response filed Jan. 20, 2014 to Office Action mailed Nov. 5, 2013", with English translation of claims, 16 pgs.
"Chinese Application Serial No. 200980107871.0, Response filed Sep. 22, 2014", with English translation of claims, 18 pgs.
"Chinese Application Serial No. 200980107871.0, Response filed Jun. 18, 2012 to Office Action mailed Feb. 2, 2012", with English translation of claims, 18 pgs.
"Chinese Application Serial No. 200980111282.X, Office Action mailed Mar. 28, 2013", with English translation of claims, 14 pgs.
"Chinese Application Serial No. 200980111282.X, Office Action mailed May 26, 2014", with English translation of claims, 14 pgs.
"Chinese Application Serial No. 200980111282.X, Office Action mailed Dec. 3, 2013", with English translation of claims, 8 pgs.
"Chinese Application Serial No. 200980111282.X, Response filed Feb. 18, 2014 to Office Action mailed Dec. 3, 2013", with English translation of claims, 16 pgs.
"Chinese Application Serial No. 200980111282.X, Response filed Aug. 8, 2013", with English translation of claims, 19 pgs.
"Chinese Application Serial No. 200980111282.X, Response filed Oct. 9, 2014", with English translation of claims, 18 pgs.
"eBay Launches New Mobile Application for Consumers in Europe", [Online]. Retrieved from the internet: <URL: http://investor.ebay .com/releasedetail.cfm?ReleaseID=336380>, (2008), 1 pg.
"European Application Serial No. 09717996.4, Examination Notification Art. 94(3) mailed Jul. 23, 2013", 7 pgs.

(56) References Cited

OTHER PUBLICATIONS

"European Application Serial No. 09717996.4, Extended European Search Report mailed Feb. 17, 2011", 6 pgs.
"European Application Serial No. 09717996.4, Response filed Aug. 16, 2011 to European Search Report mailed Feb. 17, 2011", 18 pgs.
"European Application Serial No. 09717996.4, Response filed Oct. 21, 2010", 5 pgs.
"European Application Serial No. 09717996.4, Response filed Nov. 28, 2013 to Office Aciton mailed Jul. 23, 2013", 15 pgs.
"European Application Serial No. 09755185.7, Extended Search Report mailed May 18, 2012", 6 pgs.
"European Application Serial No. 09755185.7, Office Action mailed Feb. 18, 2013", 5 pgs.
"European Application Serial No. 09755185.7, Office Action mailed Oct. 8, 2014", 8 pgs.
"European Application Serial No. 09755185.7, Response filed Jun. 20, 2013 to Exam Notification Art. 94(3) mailed Feb. 18, 2013", 11 pgs.
"European Application Serial No. 09755185.7, Response filed Sep. 10, 2014", 15 pgs.
"European Application Serial No. 09755185.7, Response filed Oct. 13, 2014", 15 pgs.
"European Application Serial No. 09755185.7, Response filed Dec. 3, 2010", 4 pgs.
"European Application Serial No. 09755185.7, Response filed Dec. 4, 2012 to Extended European Search Report mailed May 18, 2012", 17 pgs.
"European Application Serial No. 09755185.7, Summons to Attend Oral Proceedings mailed Apr. 17, 2014", 5 pgs.
"International Application Serial No. PCT/US2009/001419, International Preliminary Report on Patentability mailed Sep. 16, 2010", 5 pgs.
"International Application Serial No. PCT/US2009/001419, Search Report mailed Sep. 30, 2009", 4 pgs.
"International Application Serial No. PCT/US2009/001419, Written Opinion mailed Sep. 30, 2009", 4 pgs.
"International Application Serial No. PCT/US2009/001976, International Preliminary Report on Patentability mailed Oct. 14, 2010", 5 pgs.
"International Application Serial No. PCT/US2009/001976, Search Report mailed Oct. 6, 2009", 4 pgs.
"International Application Serial No. PCT/US2009/001976, Written Opinion mailed Oct. 6, 2009", 4 pgs.
"Korean Application Serial No. 10-2010-7024236, Notice of Allowance mailed Aug. 8, 2012", with English translation., 3 pgs.
"Korean Application Serial No. 10-2010-7024236, Office Action mailed Oct. 21, 2011", with English translation of claims, 7 pgs.
"Korean Application Serial No. 10-2010-7024236, Response filed Mar. 21, 2012 to Office Action mailed Oct. 21, 2011", with English translation of claims, 50 pgs.
"Korean Application Serial No. 2010-7022281, Notice of Final Rejection mailed Sep. 27, 2012", with English translation of claims, 12 pgs.
"Korean Application Serial No. 2010-7022281, Office Action mailed Feb. 28, 2012", with English Translation, KR Office Action, 13 pgs.
"Korean Application Serial No. 2010-7022281, Response filed Apr. 30, 2012 to Office Action mailed Feb. 28, 2012", with English translation of claims, 18 pgs.
"RedLaser—Impossibly Accurate Barcode Scanning", [Online] Retrieved from the Internet: http://redlaser.com/index.php, (Accessed Jul. 8, 2011), 2 pgs.
"S60 Camera Phones Get Image Recognition Technology", [Online]. Retrieved from the Internet: <URL: http://news.softpedia.com/news/S60-Camera-Phones-Get-Image-Recognition-Technology-79666.shtml>, (Feb. 27, 2008), 2 pgs.
"SnapTell: Technology", [Online]. Retrieved from the Internet: <URL: http://web.archive.org/web/20071117023817/http://www.snaptell.com/technology/index.htm>, (Nov. 17, 2007), 1 pg.
"YouTube Occipitaihq, RedLaser 2.0: Realtime iPhone UPC barcode scanning", [Online] Retrieved from the Internet: http://www.youtube.com/watch?v=9__6k visited Jul. 8, 2011, (Jun. 16, 2009), 1 pg.
Chai, Douglas, et al., "Locating and Decoding EAN-13 Barcodes from Images Captured by Digital Cameras", IEEE, ICICS, (2005), 5 pgs.
Gonsalves, Antone, "Amazon Launches Experimental Mobile Shopping Feature", [Online]. Retrieved from the Internet: <URL: http://www.informationweek.com/news/internet/retail/showArticle.jhtml?articleID=212201750&subSection=News>, (Dec. 3, 2008), 1 pg.
Grandhi, Roopnath, et al., "Image Recognition as a Service", U.S. Appl. No. 61/033,940, filed Mar. 5, 2008, 56 pgs.
Ohbuchi, et al., "Barcode Reader using the Camera Device in Mobile Phones", Proceedings of the 2004 International Conference on Cyberworlds (CW'04), (2004), 6 pgs.
Parker, J.R., et al., "Algorithms for Image Processing and Computer Vision", Wiley Computer Publishing, (1997), 23-29.
Patterson, Ben, "Amazon iPhone app takes snapshots, looks for a match", [Online]. Retrieved from the Internet: <URL: http://tech.yahoo.com/blogs/patterson/30983>, (Dec. 3, 2008), 3 pgs.
Terada, S., "New cell phone services tap image-recognition technologies", [Online]. Retrieved from the Internet: <URL: http://search.japantimes.co.jp/cgi-bin/nb20070626a1.html>, (Jun. 26, 2007), 3 pgs.
"U.S. Appl. No. 12/145,313, Appeal Decision mailed Sep. 25, 2015", 5 pgs.
"U.S. Appl. No. 12/371,882, Examiner Interview Summary mailed Jul. 21, 2015", 4 pgs.
"U.S. Appl. No. 12/371,882, Final Office Action mailed Jun. 25, 2015", 27 pgs.
"U.S. Appl. No. 12/371,882, Non Final Office Action mailed Mar. 12, 2015", 29 pgs.
"U.S. Appl. No. 12/371,882, Response filed Jun. 12, 2015 to Non Final Office Action mailed Mar. 12, 2015", 8 pgs.
"U.S. Appl. No. 12/371,882, Response filed Sep. 25, 2015 to Final Office Action mailed Jun. 25, 2015", 13 pgs.
"U.S. Appl. No. 12/398,957, Applicant Interview Summary filed Jan. 19, 2015", 1 pg.
"U.S. Appl. No. 12/398,957, Examiner's Answer mailed Jan. 14, 2015", 10 pgs.
"U.S. Appl. No. 12/398,957, Reply Brief filed Mar. 13, 2015", 9 pgs.
"U.S. Appl. No. 13/333,934, Examiner Interview Summary mailed Feb. 24, 2015", 3 pgs.
"U.S. Appl. No. 13/333,934, Final Office Action mailed Mar. 24, 2015", 20 pgs.
"U.S. Appl. No. 13/333,934, Non Final Office Action mailed Sep. 10, 2015", 19 pgs.
"U.S. Appl. No. 13/333,934, Response filed Feb. 3, 2015 to Non Final Office Action mailed Oct. 3, 2014", 15 pgs.
"U.S. Appl. No. 13/333,934, Response filed Jul. 24, 2015 to Final Office Action mailed Mar. 24, 2015", 16 pgs.
"Chinese Application Serial No. 200980107871.0, Decision of Reexamination mailed Nov. 30, 2015", W/ English Translation, 11 pgs.
"Chinese Application Serial No. 200980107871.0, Office Action mailed Aug. 7, 2015", 14 pgs.
"Chinese Application Serial No. 200980107871.0, Response filed Sep. 22, 2015 to Office Action mailed Aug. 7, 2015", 16 pgs.
"European Application Serial No. 09755185.7, Office Action mailed Oct. 31, 2014", 20 pgs.

* cited by examiner

IMAGE-BASED INDEXING IN A NETWORK-BASED MARKETPLACE

RELATED APPLICATION

This application is a continuation of U.S. patent application Ser. No. 12/406,016, filed on Mar. 17, 2009, the benefit of priority of which is claimed hereby, and which is incorporated herein by reference in its entirety.

BACKGROUND

As the use of network-based publication systems and marketplaces, such as on-line commerce services or auction services expands, and the volume of item listings in such applications increases, the speed, ease and convenience with which information can be retrieved from such marketplaces increases in importance to customers.

Item listings in such network-based marketplaces typically include details of a particular item which is e.g. up for sale or auction and these details are typically stored in text format and include a description of the item together with other information, such as the price, useful to a potential buyer in assessing the item listing, in addition, item listings often include visual material related to the item, typically in the form of a photograph, drawings or video clips.

The use of images in this context has customarily been limited to the provision of information about item listings to customers, but it would be useful to employ images associated with item listings for additional purposes, such as for image-based searching or for the automatic identification of images for fraud protection purposes.

BRIEF DESCRIPTION OF DRAWINGS

Some embodiments are illustrated by way of example and not limitation in the figures of the accompanying drawings in which.

DETAILED DESCRIPTION

Figure 1:
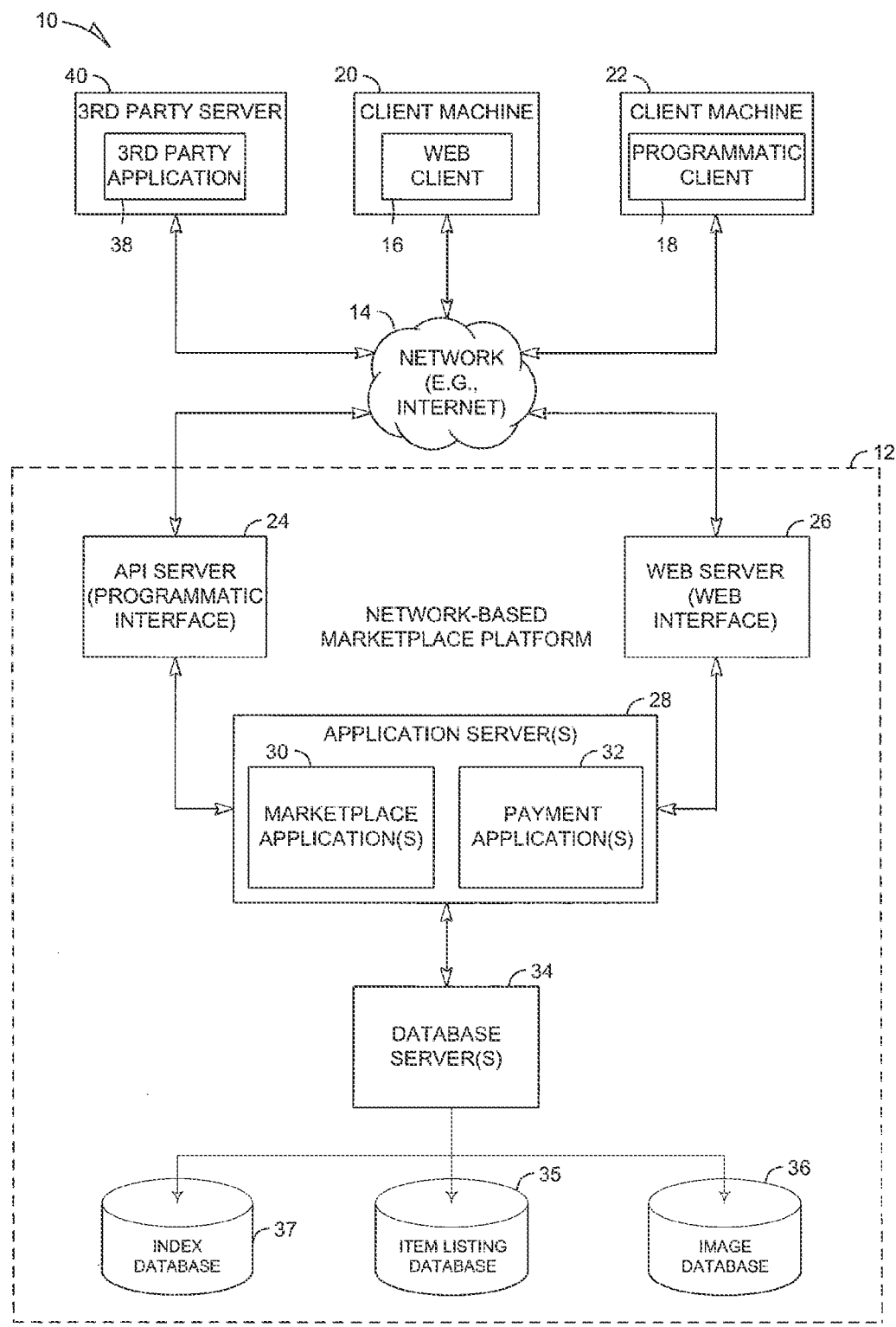
FIG. 1 is a block diagram illustrating a publication system in the example form of network-based marketplace system according to an example embodiment.

In the following description, for purposes of explanation, numerous specific details are set forth in order to provide a thorough understanding of some example embodiments. It will be evident, however, to one skilled in the art that the present invention may be practiced without these specific details.

In an example embodiment, there is provided a system and a method to index images associated with item listings in a network-based marketplace, so that subsequent search or comparison operations are performed on index data instead of on base images stored in an image database. Images in the image database are thus indexed by parsing or processing the images for feature extraction. The feature extraction may include generating multiple sets of index values associated with each image. Each set of index values is also referred to as a feature vector or an image fingerprint.

The index sets are associated with their respective images in a so-called reverse indexing arrangement, in which the index database contains a single entry for each unique index set or feature vector, with all the images that contain that particular index set or feature vector being listed against the entry.

When, for instance, a query image is subsequently presented in order to search for identical or similar images in the image database, the query image is itself parsed or processed to generate multiple feature vectors or sets of index values for the query image. The index sets for the query image are thus generated in a similar manner to the generation of index sets for the index database.

To identify images similar to the query image, all of the query image's index sets are compared to index sets in the index database. When commonality is identified between a query image index set and a database index vector, a hit count is incremented for each of the images associated with that index set in the index database. The database images are ranked in order of hit count, so that the result of the search are those item listings whose images have index sets showing the greatest commonality with the index sets of the query image.

In an example embodiment, the index sets are generated by first performing an edge detection algorithm on the image and then normalizing the image. Thereafter, the image is divided into a raster of cells or sub-portions at a resolution which is usually significantly lower than its native pixel resolution, so that each cell or sub-portion comprises many image pixels. The raster may typically be a 10 by 10 grid of cells. Next, an index value is assigned to each cell based on an image attribute, typically a light intensity value, of the underlying image pixels. The result is therefore a grid of index values. Thereafter, sets of index values (i.e. feature vectors) are created from respective overlapping portions of the grid of index values. This process can be explained as a sliding window that is moved over the grid to isolate two dimensional selections or portions of index values at a time, the portions overlapping and covering the entire grid. The index values in each selection or portion together form one feature vector or set of index values. In an example embodiment, the moving window is three by three cells in size, so that each feature vector is constituted by nine index values.

The system and method thus provides for image comparison in a publication system, such as a network-based marketplace, which requires significantly less processing power, and is therefore faster than image comparison based on native image data, while returning results with relatively high accuracy. The method is furthermore relatively robust and insensitive to scaling and resolution loss.

Architecture

One example embodiment of a distributed network implementing image-based indexing for item listings in a network-based marketplace is illustrated in the network diagram of FIG. 1, which depicts a system 10 using a client-server type architecture. A commerce platform, in the example form of a network-based marketplace platform 12, provides server-side functionality, via a network 14 (e.g., the Internet) to one or more clients. As illustrated, the platform 12 interacts with a web client 16 executing on a client machine 20 and a programmatic client 18 executing on a client machine 22. In one embodiment, web client 16 is a web browser, but it may employ other types of web services.

Turning specifically to the network-based marketplace platform 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to a number of databases, in particular an item listing database 35, an image database 36, and an index database 37. The item listing database 35 stores data indicative of item listings for items which are offered for sale or auction on the platform 12. Each item listing includes, inter alia, a text description of the relevant item and metadata categorizing the item. The image database 36 includes images associated with respective item listings in the item listing database 35. The images in the image database 36 may be standard format image files such as JPEG files. The index database 37 contains index data relating to images in the image database to permit image-based searching of the image database 36. The format of index data in the index database is described in more detail below.

The marketplace applications 30 provide a number of marketplace functions and services to users that access the marketplace platform 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace platform 12, it will be appreciated that, in alternative embodiments, the payment applications 32 may form part of a payment service that is separate and distinct from the marketplace platform 12.

Further, while the system 10 shown in FIG. 1 employs a client-server architecture, the present invention is of course not limited to such an architecture, and could equally well find application in a distributed, or peer-to-pee, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace platform 12 in an off-line manner, and to perform batch-mode communications between the programmatic client 18 and the network-based marketplace platform 12.

FIG. 1 also illustrates a third party application 38, executing on a third party server machine 40, as having programmatic access to the network-based marketplace via the programmatic interface provided by the API server 24. For example, the third party application 38 rimy, utilizing information retrieved from the network-based marketplace platform 12, support one or more features or functions on a website hosted by the third party. The third party website may, for example, provide one or more promotional, marketplace or payment functions that are supported by the relevant applications of the network-based marketplace platform 12.

Figure 2:
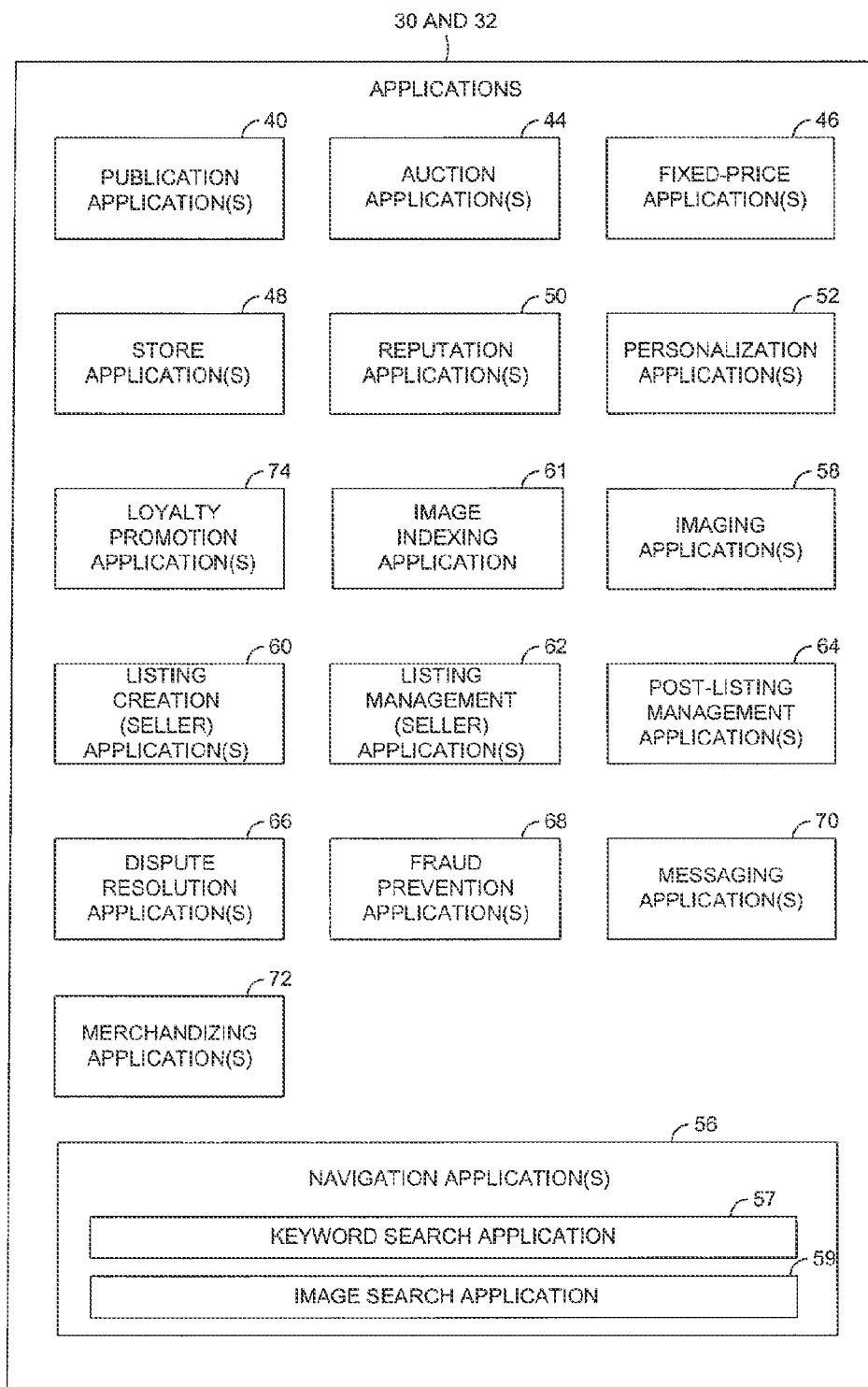
FIG. 2 is a diagrammatic representation of marketplace and payment applications which may form part of the example embodiment of FIG. 1.

FIG. 2 is a block diagram illustrating multiple marketplace and payment applications 30 and 32 that, in one example embodiment, are provided as part of the network-based marketplace platform 12. The marketplace platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include at least one publication application 41 and one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace platform 12 to establish, build and maintain reputations, which may be made available and published to potential trading partners. Consider that where, for example, the network-based marketplace platform 12 supports person-to-person trading, users may have no history or other reference information whereby the trustworthiness and credibility of potential trading partners may be assessed. The reputation applications 50 allows a user, for example through feedback provided by other transaction partners, to establish a reputation within the network-based marketplace platform 12 over time. Other potential trading partners may then reference such a reputation for the purposes of assessing credibility and trustworthiness.

Personalization applications 52 allow users of the marketplace platform 12 to personalize various aspects of their interactions with the marketplace platform 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace and other parties.

In one embodiment, the network-based marketplace platform 12 may support a number of marketplaces that are customized, for example, for specific geographic regions. A version of the marketplace may be customized for the United Kingdom, whereas another version of the marketplace may be customized for the United States. Each of these versions may operate as an independent marketplace, or may be customized (or internationalized) presentations of a common underlying marketplace.

Navigation of the network based-marketplace may be facilitated by one or more navigation applications 56. For example, a keyword search application 57 enables keyword searches of listings published via the marketplace platform 12. Similarly, an image search application 59 enables an image-based search of item listings published via the marketplace platform 12. To perform an image-based search, a user will typically submit a query image, whereupon the image search application 59 may compare the query image to images in the image database to produce a result list of item listings based on a similarity ranking between the query image and the images associated with the respective item listings. The comparison ranking is established by parsing or processing the query image to provide index data, and thereafter comparing the query image's index data to pre-compiled index data for the listing images, as described in more detail below. A browse application allows users to browse various category, catalogue, or inventory data structures according to which listings may be classified within the marketplace platform 12. Various other navigation applications may be provided to supplement the search and browsing applications.

In order to make listings, available via the network-based marketplace, as visually informative and attractive as possible, as well as to enable image-based searching, the marketplace applications 30 may include one or more imaging applications 58, which users may use to upload images for inclusion within listings. Images thus uploaded are stored in the image database 36, each image being associatively linked to at least one item listing in the item listing database 35. One of the imaging applications 58 also operates to incorporate images within viewed listings. The imaging applications 58 may also support one or more promotional features, such as image galleries that are presented to potential buyers. For example, sellers may pay an additional fee to have an image included within a gallery of images for promoted items.

The marketplace platform 12 may also include an image indexing application 61 to parse or process images uploaded via the image application 58, as well as to parse or process query images submitted via the image search application 59. The result of processing images by the image indexing application 61 is index data which is stored in the index database 37. Particular processes for indexing images, as well as the format of index data, are discussed in/no/e detail below.

Listing creation applications 60 allow sellers conveniently to author listings pertaining to goods or services that they wish to transact via the marketplace platform 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc) to assist the seller in managing such listings. One or more post-listing management applications 64 also assists sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace. One of the fraud prevention applications 68 may include automatic image comparison, by use of index data produced by the image indexing application 61 and stored in the index database 37. Such image comparison may be used by the fraud prevention application 68 automatically to detect listing images similar to the query image, and to alert a fraud assessor to such image listings, so that the human assessor can examine the identified item listing for assessing whether or not the identified item listing is a fraudulent listing.

Messaging applications 70 are responsible for the generation and delivery of messages to users of the network-based marketplace platform 12, such messages for example advising users regarding the status of listings at the marketplace (e.g., providing "outbid" notices to bidders during an auction process or providing promotional and merchandising information to users).

Merchandising applications 72 support various merchandising functions that are made available to sellers to enable sellers to increase sales via the marketplace platform 12. The merchandising applications 72 also operate the various merchandising features that may be invoked by sellers, and may monitor and track the success of merchandising strategies employed by sellers.

The network-based marketplace platform 12 itself, or one or more parties that transact via the marketplace, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Figure 3:
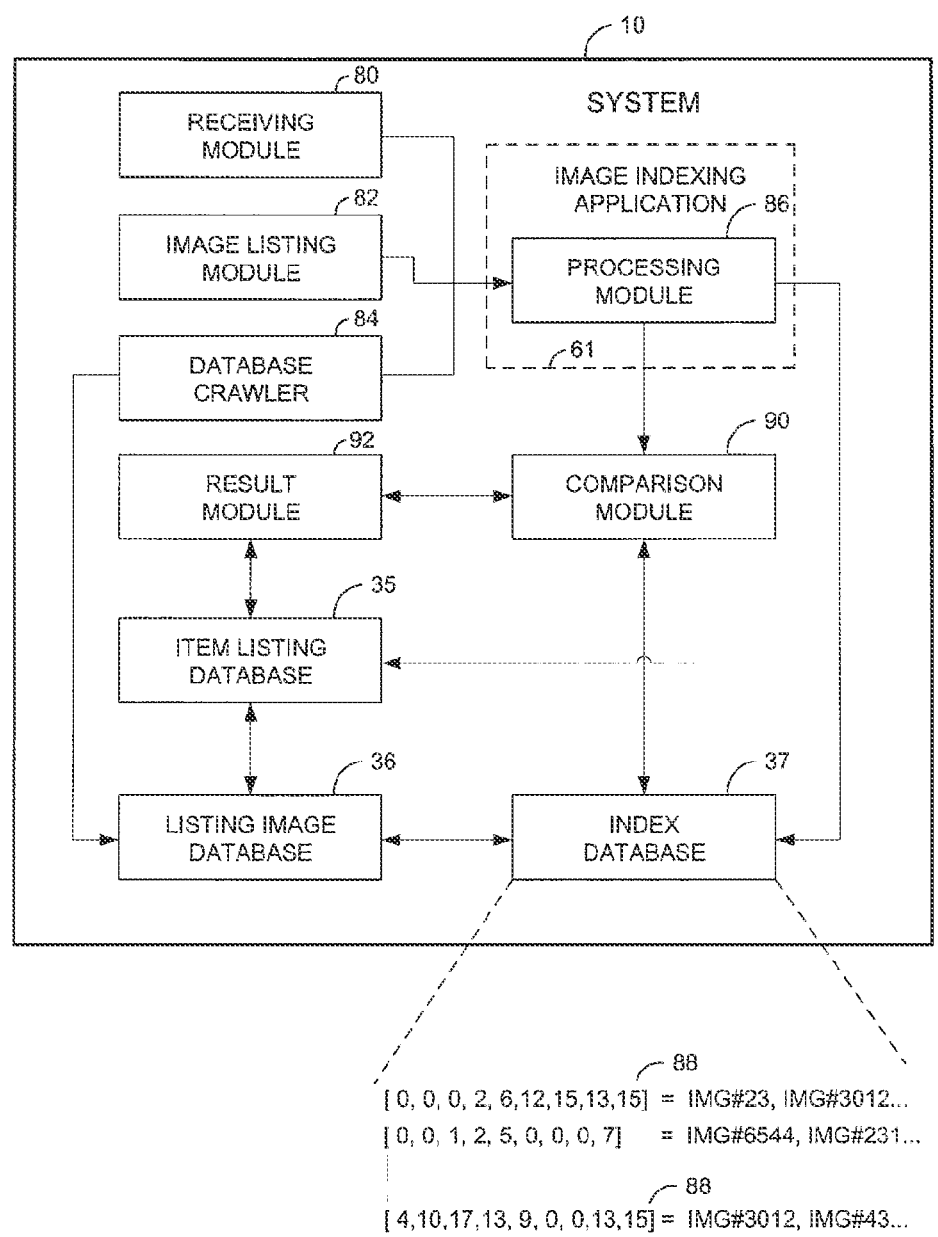
FIG. 3 is a diagrammatic representation of functional models and databases which may form part of the example embodiment of FIG. 1.

FIG. 3 is a high-level entity-relationship diagram, illustrating the relationship between the databases 35 to 37 and several functional modules forming part of the applications 30 and 32. The system includes a receiving module 80, which may form part of the image search application 59 (FIG. 2), for receiving a listing query which includes a query image. Query images which may be submitted to the receiving module 80 are typically electronic image files in a standard format, such as JPEG, GIF, TIFF, etc.

The receiving module 80 is operatively connected to a processing module 86, which may form part of the image indexing application 61, for processing images to generate index data for the images. An example method of processing images by the processing module 86 to generate the index data is described in more detail below. An image listing module 82, which may form part of the listing creation application 60 of FIG. 2, is operatively connected to the processing module 86 to communicate to the processing module 86 images forming part of newly created item listings. The system further includes a database crawler 84 which serves to interrogate the listing image database 36 in order to identify images in the listing image database 36 which have not yet been processed by the image indexing application 61, and for which there is thus no associated index data in the index database 37. It will be appreciated that indexing of images in accordance with an example embodiment may in certain instances be implemented in a network-based marketplace having large numbers of existing listing images for which there are, of course, no index data. To permit image-based searching of the listing image database 36 through the use of index data, the database crawler may continually locate and submit un-indexed legacy images in the listing image database 36 and pass them to the processing module for imaging. It should be noted accordingly that although image database 36 is illustrated in the figures by a single element, the image database 36 may be provided by any number of databases distributed through a network.

The processing module 86 is configured to parse or process images submitted to it to generate index data in the form of a number of a feature vector or index sets 88 for each image. In an example embodiment, each index set 88 comprises a sequence of nine index values, as shown in FIG. 3. These index sets 88 are also referred to as feature vectors or image fingerprints, and the terms "index set", "set of index values", and "feature vector" are used interchangeably in this document to refer to the results of indexing of images by the processing module 86.

The processing module 86 is in communication with the index database 37, to communicate index data generated by the processing module 86 to the index database 37 for storage. In an example embodiment, index data is related in the index database 37 to images stored in the listing image database 36 in a reverse-indexing format. The data format in the index database 37 may be in a spatial data structure, such as a two-dimensional k-d tree, to facilitate searching of the database 37. As illustrated in FIG. 3, the index database has stored therein a single entry for each unique feature vector 88, with each entry listing all of the database images which share that feature vector 88. For example with reference to FIG. 3, it will be understood that one of the feature vectors 88 produced by processing of an image with the filename IMG#23, stored in the image database 36, was [0, 0, 0, 2, 6, 12, 15, 13, 15], and that this feature vector was also one of the feature vectors 88 produced by processing of IMG#3012. It should be appreciated that multiple feature vectors 88 are generated by the processing of each image, and that a particular image will thus be listed in the index database against each of the multiple feature vectors 88 thus produced. For instance, the example given in FIG. 3 shows that the results of indexing of IMG#3012 included feature vector [0, 0, 0, 2, 6, 12, 15, 13, 15] and feature vector [4, 10, 17, 13, 9, 0, 0, 13, 15].

Each entry in the index database 37 is linked to at least one image in the listing image database 36. Further, the images stored in the image database 36 are linked to associated item listings in the item listing database 35. As discussed above, each item listing may comprise information about a particular item which is offered for sale or auction on the marketplace platform 12, such as a description of the item, at least one category of the item, a brand name of the item, etc. In the example embodiment, entries in the respective databases 35 to 37 are linked by use of image filenames as linking data. A person skilled in the art will appreciate that, in other embodiments, any appropriate data structure, e.g. relational databases or tables, may be used to link images in the image database 36 to, on the one hand, respective item listings and to, on the other hand, index data in the index database 37.

A comparison module 90 is in communication with both the processing module 86 and the index database 37, to compare index data for a query image with the index data in the index database 37 for finding database images similar to the query image. The comparison module, in use, produces a ranking of database images according to similarity to the query image. This ranking is achieved by comparing the feature vectors 88 of the query image, which is generated by the processing module 86, with feature vector entries in the index database 3 accordance with a comparison method which is described in more detail below.

The system 10 also includes a result module 92 for delivering to a user the results of a search query which includes a query image. The result module 92 is configured to return query search results as item listings ranked in order of the similarity of their respective images to the query image, as determined by the comparison module 90. The search results may be delivered by the user in a format of the user's choosing, such as, for instance, via e-mail or in http format on a web browser application.

Flowcharts

Figure 4:
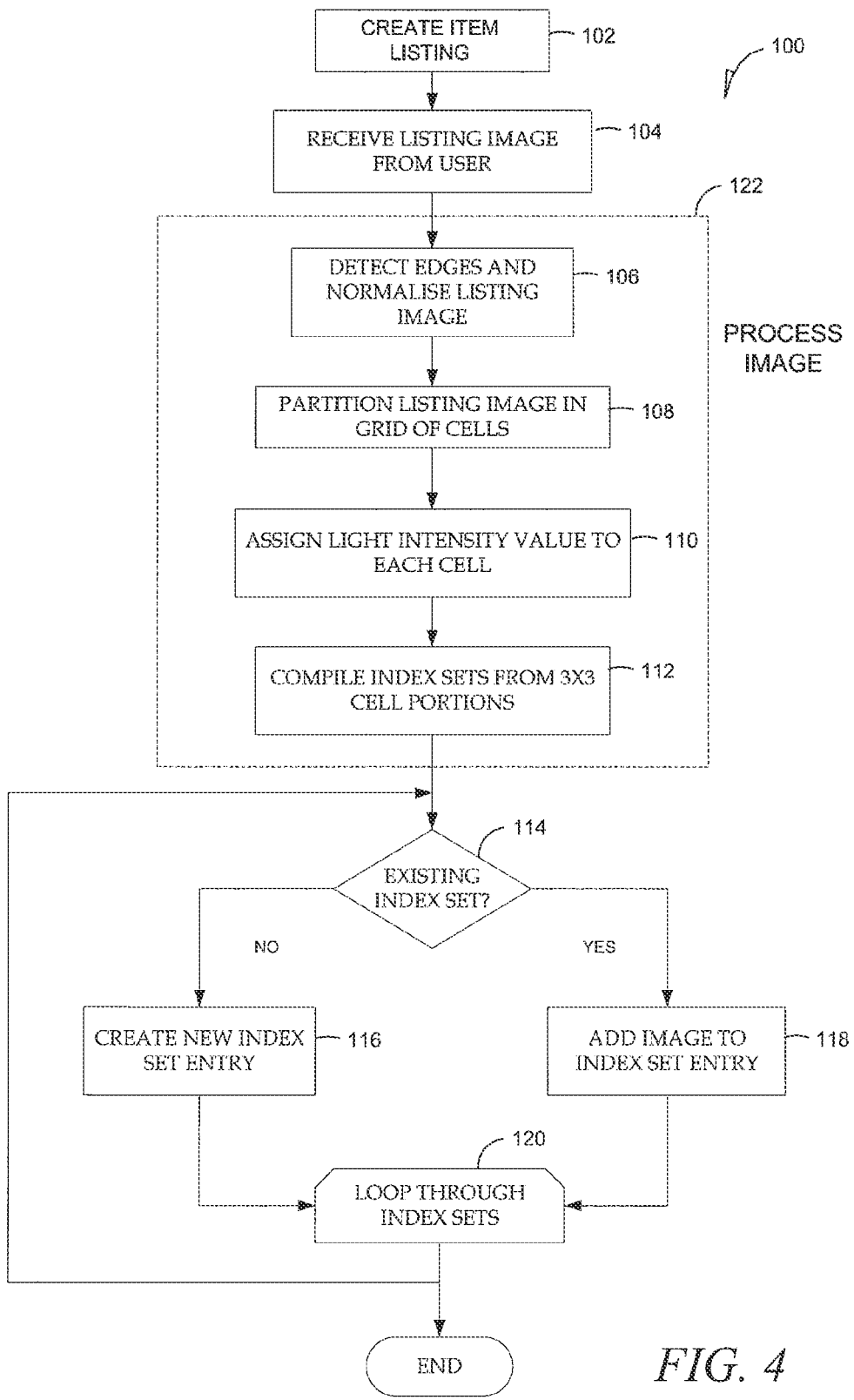
FIG. 4 is a flow chart illustrating an example method to index a listing image according to an example embodiment.

FIG. 4 is a flowchart showing a method 100 for processing an image in a network-based marketplace in accordance with an example embodiment. The method 100 starts with the creation of an item listing, at block 102, by a user via the listing creation application 60 (FIG. 2) in customary fashion. Creation of the item listing may include submission of an image related to the image, typically being an image of the item which is offered for sale or auction on the marketplace. The submitted image is received by the receiving module 80, at block 104.

The image may be an electronic image in standard file format, such as PEG, which comprises a raster of pixels. Each pixel may have hue, saturation, and intensity values, in conventional fashion. It will be appreciated that images which were submitted earlier and which are stored in the image database 36, but which have not been indexed, may be provided to the processing module 86 by the database crawler 84 of FIG. 3, so that operation 102 in FIG. 4 may instead comprise submitting an un-indexed image from the image database 36 for processing.

Figure 6:
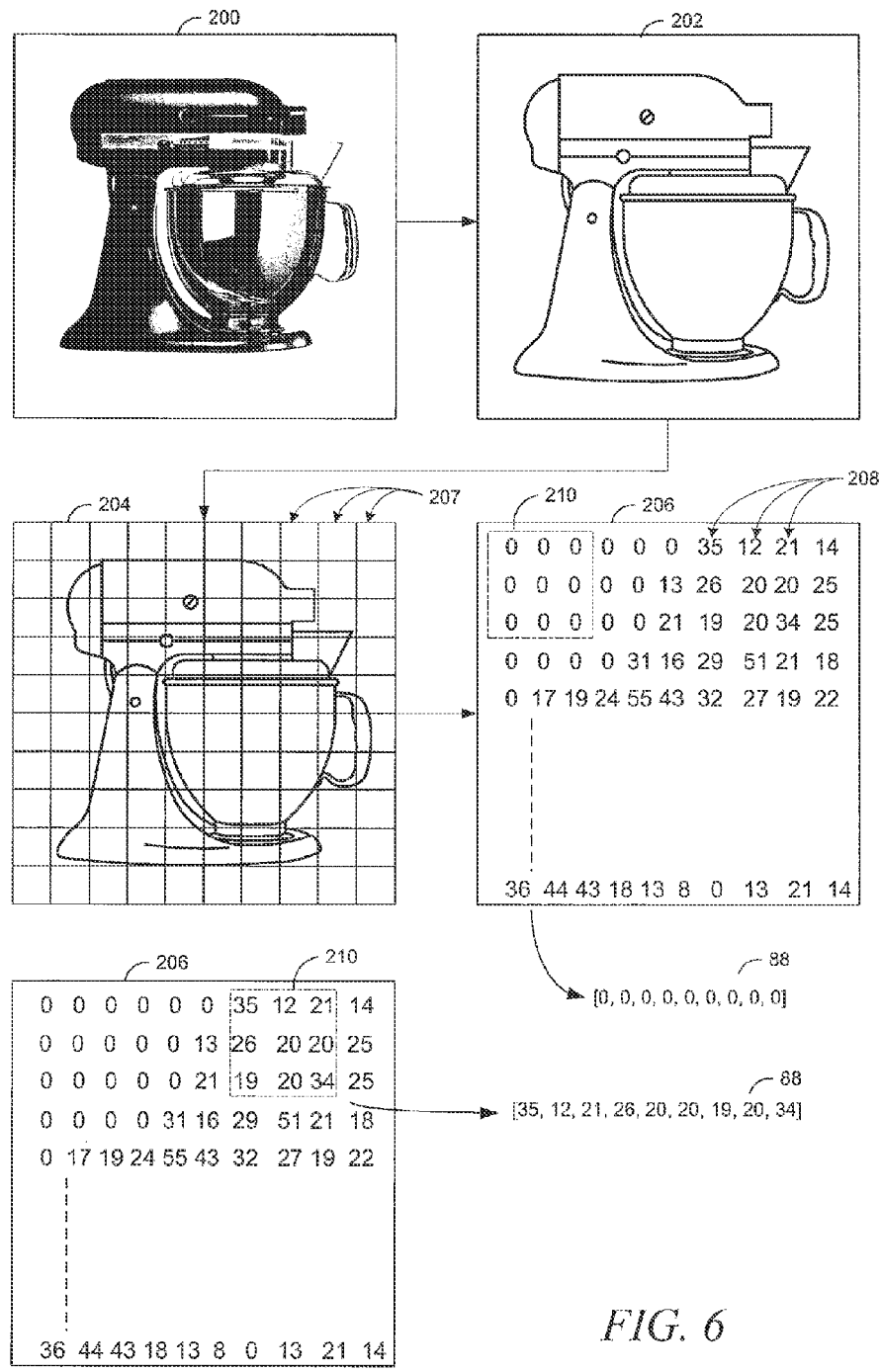
FIG. 6 is a schematic view of operations which may be performed on an image for indexing thereof according to an example embodiment.

The submitted image is then processed, at block 122, to generate index data for enabling index searching of database images. Processing of the image will be described at the hand of an example image 200 illustrated in FIG. 6. First, an edge detection and normalisation operation is performed, at block 106, on the image 200, to produce a normalised edge image 202 (FIG. 6). Edge detection processing is well known in the art and any suitable edge detection algorithm may be employed in operation 106. Normalisation of the image includes desaturation, so that the normalised edge image 202 is a greyscale image. Normalization may further include contrast stretching or dynamic range expansion, to achieve consistency in intensity ranges for images processed by the processing module 86. Furthermore, normalization of the image may include re-alignment of the image 200 by automated correction of the image's orientation.

The normalised edge image 202 is then partitioned or divided, at block 108, into cells or sub-portions 207, to form a grid 204 (FIG. 6). In the example embodiment, the resolution of the grid is ten by ten, so that the grid comprises ten rows of ten sub-portions or cells 207 each. Because the size of each block or cell 207 is considerably larger than that of the image's pixels, each cell 207 consists of a plurality of pixels. It will be appreciated that the resolution of the grid may differ in other embodiments.

Thereafter, an index value 208 is assigned, at block 110, to each cell 207 based on an image attribute of the underlying image pixels of the cell 207. In this example, the image attribute is intensity, typically measured on a scale of 0 to 255, or alternatively 0 to 100, where a pixel having a zero intensity is white and a pixel having intensity value of 255 (or 100, as the case may be) is black. The index value 208 assigned to each cell 207 may thus be the average light intensity value of the pixels constituting each cell 207. The output of operation 110 is therefore a ten-by-ten grid 206 of index values 208 based on the intensity values of the respective cells 207 (FIG. 6). The grid 206 can be viewed as a two-dimensional histogram of the base image 200. It is to be appreciated that the particular index values 208 and the particular index sets 88 illustrated in FIGS. 3 and 6, and in other examples in this document, are chosen arbitrarily for illustrative purposes and do not accurately reflect the underlying intensity values of the illustrated images.

In other example embodiments, other image attributes can be used as well as or instead of the intensity value. For instance, colour values of the cells 207 may be calculated and indexed together with or instead of the intensity index values. An index value may for instance assigned to each cell 207 based on the average hue of the cell's pixels. Instead, separate grids may be produced for red, green and blue colour spaces, and index values based on the intensity values of the respective colours in the cells may be assigned to the cells.

At block 140, feature vectors or index sets 88 are compiled from the grid 206. Compilation of the index sets 88 comprises iteratively isolating portions 210 of the grid 206 and listing the index values 208 in each portion 210 in sequence, to provide an index set 88. Compilation of the index sets 88 can thus be described as a sliding, overlapping mask or window 210 which is three-by-three index values in size, and which iteratively isolates all possible contiguous three-by-three selections in the grid 206, to generate respective index sets 88. Each index set 88 thus comprises a sequence or vector of nine index values 208. Although only two of these index sets 88 are shown in FIG. 6, it will be appreciated that the results of index set compilation for a ten-by-ten grid 206 will be 64 index sets.

The index sets 88 thus generated are incorporated in the index database 37. As explained above with reference to FIG. 3, the index database 37 comprises a single entry for each unique feature vector or index set 88, with all images which contain that index set 88 being listed in the entry. To this end, each index set 88 generated in operation 112 is processed by first establishing, at block 114, whether or not the index database 37 already includes an entry for that particular index set 88. If the determination at block 114 is in the affirmative, the image which is the subject of current processing is linked, at block 118, to the existing entry in the index database 37 by including the image filename in the listing of images in the respective database entry, if, however, the determination is in the negative and there is not yet a database entry for the index set 88 under consideration, a new index set entry is created, at block 116, in the index database 37. It will be appreciated that such a new database entry will have only the current image associated with the particular index set 88. This database writing sequence is looped, at block 120, through all of the index sets 88 generated at operation 112, therefore being performed 64 times in the example embodiment having a ten-by-ten grid 206.

Figure 5:
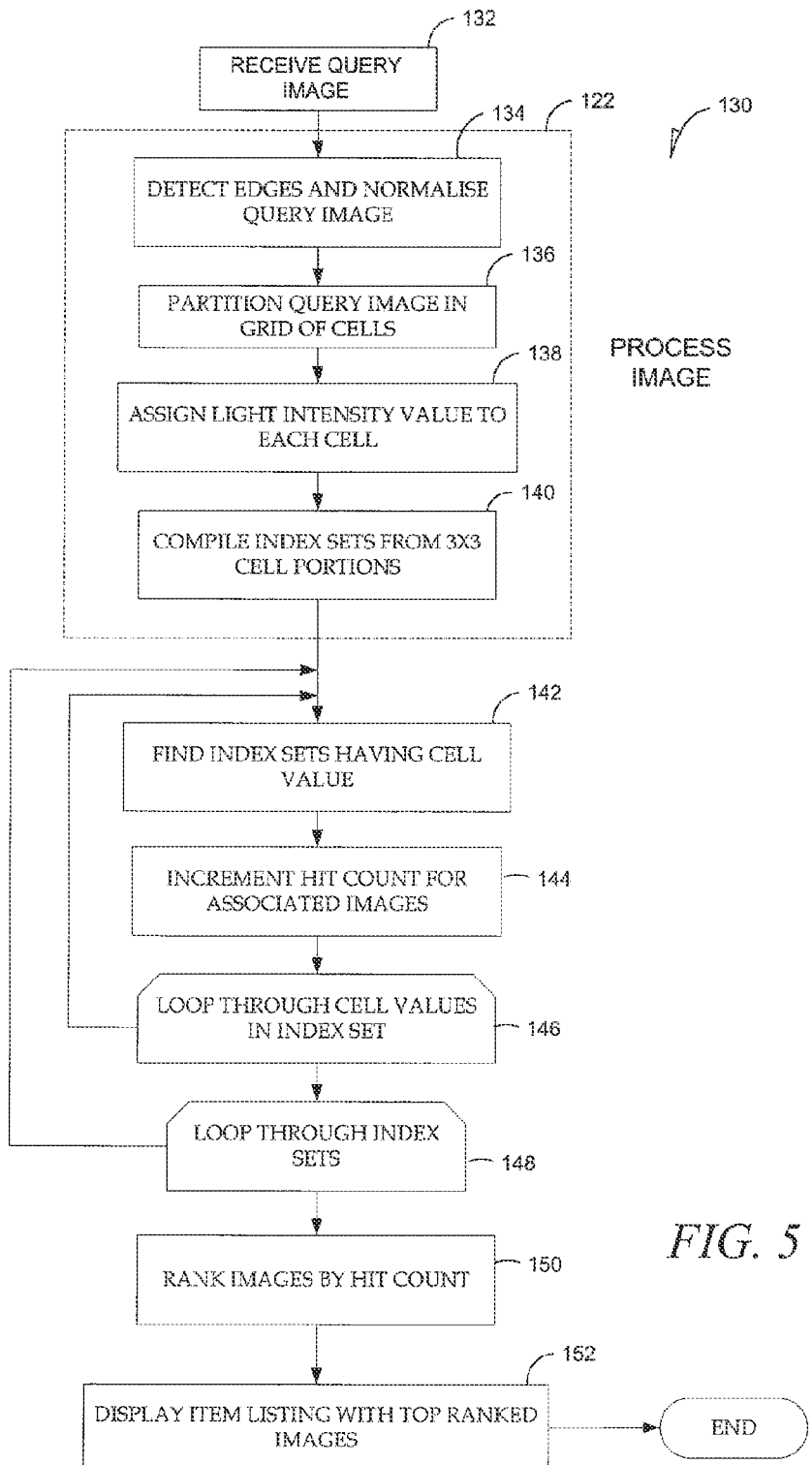
FIG. 5 is a flow chart illustrating an example method to perform an image-based search in the example embodiment of FIG. 1.

FIG. 5 is flowchart of a method 130 of image-based searching in accordance with an example embodiment. The method 130 is initiated by user submission of a query, at block 132, via the image search application 59 of FIG. 2, and includes a query image on which the search is to be based. The query image is again a digital image in a standard file format. A user wishing, for instance, to search for item listings in respect of a particular device may photograph the target device, for example by use of a mobile phone with image capturing capabilities, and may submit the image to the image search application instead of or in addition entering text in the keyword search application 57.

The query image is processed, at block 122, by the processing module 86 to generate index sets 88 for the query image in a manner identical to indexing of images in accordance with the method 100 of FIG. 5. Edge detection and normalisation of the image is thus performed, at block 106, whereafter the query image is partitioned in a grid of cells 207, at block 108. Then, index values 208 are assigned to each cell 207 based on the intensity values of the underlying pixels of the cell 207, and index sets 88 are compiled by use of the sliding, overlapping window 210 method described above.

After generation of the query index sets 88 from the query image, the query feature vectors or index sets 88 are compared to the index data in the index database 37 to identify images similar or identical to the query image. To this end, the comparison module 90 processes each of the query index sets 88 in turn. The comparison module 90 steps or loops, at block 146, through the index values 208 of a particular index set 88 to find, at block 142, all index set entries in the index database 37 that share that index value 208. For each index entry identified as sharing the particular index value 208 under consideration, a hit count is incremented for each of the images associated in the index database 37 with the identified database entry. The database images are then ranked in descending order according to hit count.

In an example where the first query index set 88 is [24, 12, 13, . . . , 4], the first index value 208 is 24. If the index database 37 includes the following entries:

1. [0, 0, 24, 16, 26, . . . ]=IMG#221, IMG#3224, IMG#6739
2. [36, 48, 18, . . . ]=IMG#644, IMG#2542
3. [24, 12, 0, 0, . . . ]=IMG#3224, IMG#2143, the first iteration of operation 142, in respect of value 24, will result in an increment in the hit count of the images in data entries 1 and 3 above. The second iteration of operation 142, which will be in respect of value 12, will result in the incrementing, at block 144, of the images in data entry 3 above. The results of looping through all the index values 208 of query index set 88 shown above will be IMG#3224=3 hits; IMG#2143=2 hits, with the remainder of the listed images registering a single hit, apart from IMG#644 and IMG#2542 which will have no hits registered against them.

After repeating operations 142 to 146 for all of the index values 208 of one of the index sets 88, the process loops, at block 148, to the next query index set 88. Operations 142 to 148 are thus repeated until all of the index values of all of the query index sets 88 have been compared to the index database entries, the hit counts being aggregated to provide a ranking of images by hit count, at block 150.

In other embodiments, the comparison of index sets may include comparing all of the index values of query index sets with all of the values in the respective pre-compiled index sets forming database entries in the index database 37, to that a hit is registered only if there is complete overlap between the index values of, on the one hand, the query index set, and, on the other hand, the index values of the particular database entry. In yet further embodiments, the comparison of feature vectors or index sets may include matching not only the values of the query index sets to database entry index sets, but also matching the sequence of index values in the respective index sets. A hit will thus be registered only if the query index set matches a database entry's feature vector or index set 88 exactly, in other words if both the values and the sequence of the respective index sets are identical. To promote processing speed and efficiency when performing exact feature vector or index set matching, the index value range may be reduced in scale, so that the index values, for example, range in value from 0 to 10 instead of for example, from 0 to 100.

Instead, or in addition, the comparison operation may include a weighting of the hit count based on the position of the respective index sets in the image. In other words, hits may be assigned weights based on adjacency of the index sets in the image. Two matching index sets which were compiled from image portions or windows which are in adjacent or identical locations in the grid may therefore result in a higher weighted hit, while a lower weighted hit may be registered if the respective image portions or windows are less adjacent.

As mentioned above, pre-complied feature vectors or index sets 88 may be stored in the index database in a data structure like a k-dimensional tree, also known as a k-d tree. Comparison of a query index set or feature vector may in such cases comprise performing a nearest neighbour search in the k-dimensional tree.

The hit counts of the images are passed by the comparison module 90 to the result module 92. The result module 92 then displays to the user, at block 152, the results of the search. The search results are provided as a list of item listings extracted from the item listing database 35, the displayed item listing being the item listings linked to the top ranked images, as identified by the comparison module 90.

The system 10 and methods 100, 130 described above provides for effective image-based searching in the network-based marketplace. Indexing of the images in the image database 36 in accordance with the described example embodiment permits similarity comparison of the query image with large numbers of database images without requiring prohibitive processing power or time.

In addition to use of the indexing method 100 for user-initiated image-based searching of the database 36, it may, in other embodiments, be used for fraud prevention applications in the network-based marketplace. In such embodiments, the fraud prevention application 68, shown in FIG. 2, may be provided with a query image representing an article which may be susceptible to fraud. Image comparison as described above with reference to FIG. 5 may then automatically be performed in response to the creation of new listings, so as to flag new item listings having images with a similarity rating or weighting, as determined by index data comparison, higher than a set threshold value.

In other embodiments, the processing operation 122 to generate index sets 88 may differ in a number of aspects, some of which are described with reference to FIGS. 7-9. In one embodiment, illustrated in FIG. 7, the indexing method 100 includes producing a number of variations of a subject image 200, and processing each of the variations to produce a plurality of index sets 88 for each of the variations. In other words, a single base image 200 is used to produce multiple image variations, and each of the image variations is indexed and its index data is recorded in the index database as separate images, each of which is linked to a common item listing. Identification of any one of these image variations ranking images by hit count, at block 150 in FIG. 5, will result in the associated item listing being presented in results of an image-based query.

In another embodiment, such image variation may be performed upon searching instead of, or in addition to, image variation during indexing. In such case, a query image may thus be processed to produce multiple image variations, index sets 88 thereafter being generated for each of the variations and being compared to the index database 37.

Figure 7:
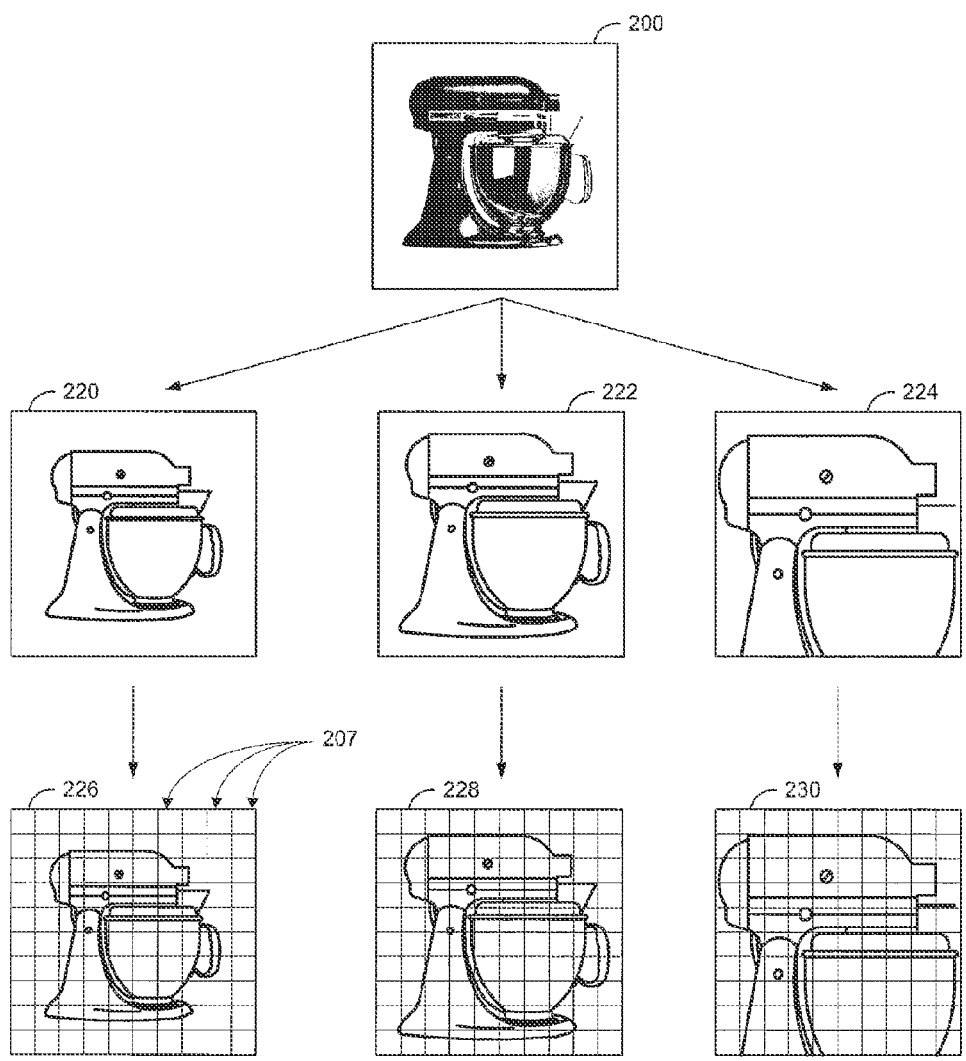
FIG. 7 is a schematic view of operations which may be performed on an image for indexing thereof according to another example embodiment.

In the embodiment illustrated in FIG. 7, the subject image is cropped at three different magnification levels to produce three edge image variations 220 to 224. Each of these edge image variations 220 to 224 are then partitioned into sub-portions 207 to provide respective grids 226 to 230. Although not illustrated explicitly in FIG. 7, the grids 226 to 230 are then assigned index values 208, and index sets 88 are compiled as described with reference to FIGS. 4 and 6, it will be appreciated that the number of magnification levels, and therefore the number of image variations 220 to 224 can be varied. In one embodiment, which is not illustrated, ten image variations based on varying cropping magnifications may be produced.

Figure 9:
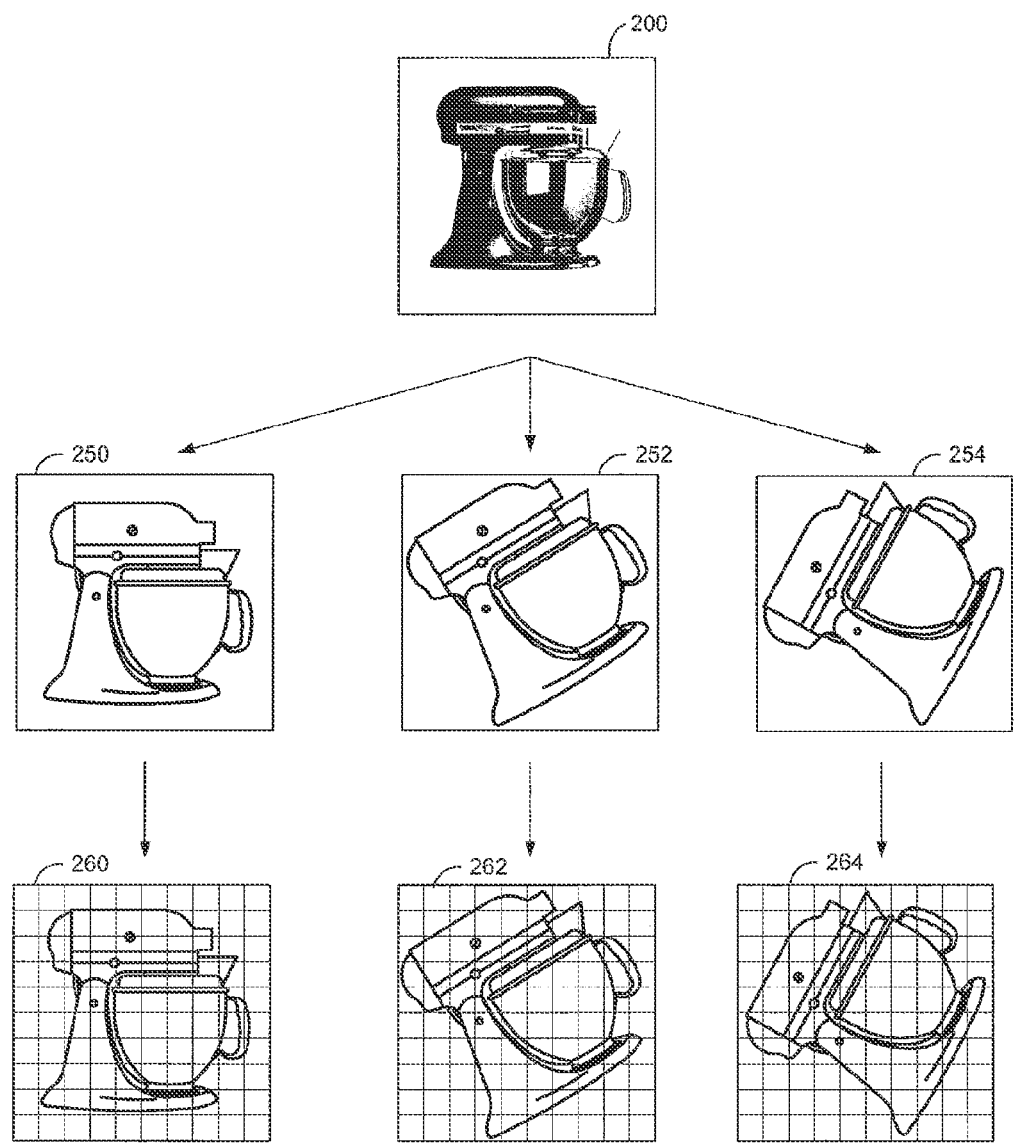
FIG. 9 is a schematic of operations which may be performed on an image for indexing thereof according to yet a further example embodiment.

In another embodiment, illustrated in FIG. 9, the subject image 200 is rotated or angularly displaced at three different angles to produce three edge image variations 250 to 254. These edge image variations 250 to 254 are then partitioned into grids 260 to 264 for further processing to generate respective collections of index sets 88.

Figure 8:
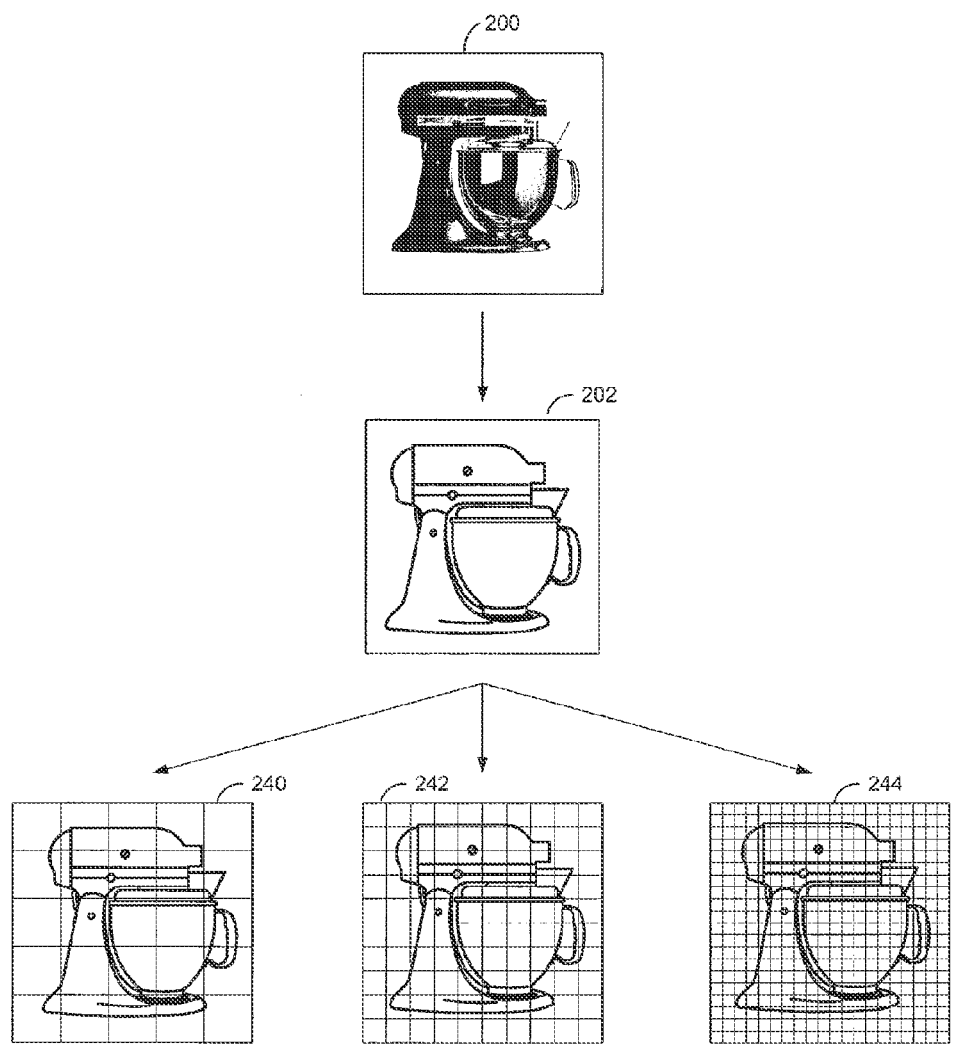
FIG. 8 is a schematic of operations which may be performed on an image for indexing thereof according to yet another example embodiment.

In yet another embodiment, illustrated in FIG. 8, the subject image is first subjected to edge detection and normalization, to produce a normalised edge image 202. Thereafter, the normalised edge image 202 is partitioned at three different grid resolutions. In the example embodiment, the image 202 is partitioned at a 5×5 resolution to produce a first grid 240; it is partitioned at a 10×10 resolution to produce a second grid 242; and it is partitioned at a 20×20 resolution to produce a third grid 244. Each of these grids is further processed to produce respective collections of index sets 88, and each of the variations 240-244 may be recorded in the index database 37. It will be appreciated that each of the variations is linked to the common image listing, so that identification of any of the variations 240 to 244 in an image-based search will result in return of an item listing associated with the subject image 200.

In another embodiment, the partitioning resolution for indexing may be determined by a category of the relevant item listing. For example, the method may include categorising an item listing upon creation, determining the item listing's category before processing the image, at block 108, and selecting the partitioning resolution based on the item listing category. For instance, apparel may be partitioned at a 10×10 resolution, while electronic devices may be partitioned at a 15×15 resolution.

It will further be appreciated that the system and methodology described above can be applied to video content as well as or instead of image data. The method may in such case include extracting images from video files, and processing the extracted images in accordance with the example embodiments described herein. Image extraction from such video content may include automatically identifying scene changes in the video content, e.g. by comparison of successive frames or images in the video content, and extracting images or frames at the start of such scene changes.

The example embodiments described herein address some of the technical challenges associated with effective processing of images linked to item listings. For instance, image databases of network-based marketplaces are often very large, comprising millions of images, so that the time and/or processing power consumed by conducting a search or image comparison in the database is prohibitive. However, a comparison of index data generated for the query image with index data of database images is considerably less resource intensive.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even anon-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed. Description, therefore, is not to be taken in a limiting sense, and the scope of various embodiments is defined only by the appended claims, along with the full range of equivalents to which such claims are entitled.

Data Structures

Figure 11:
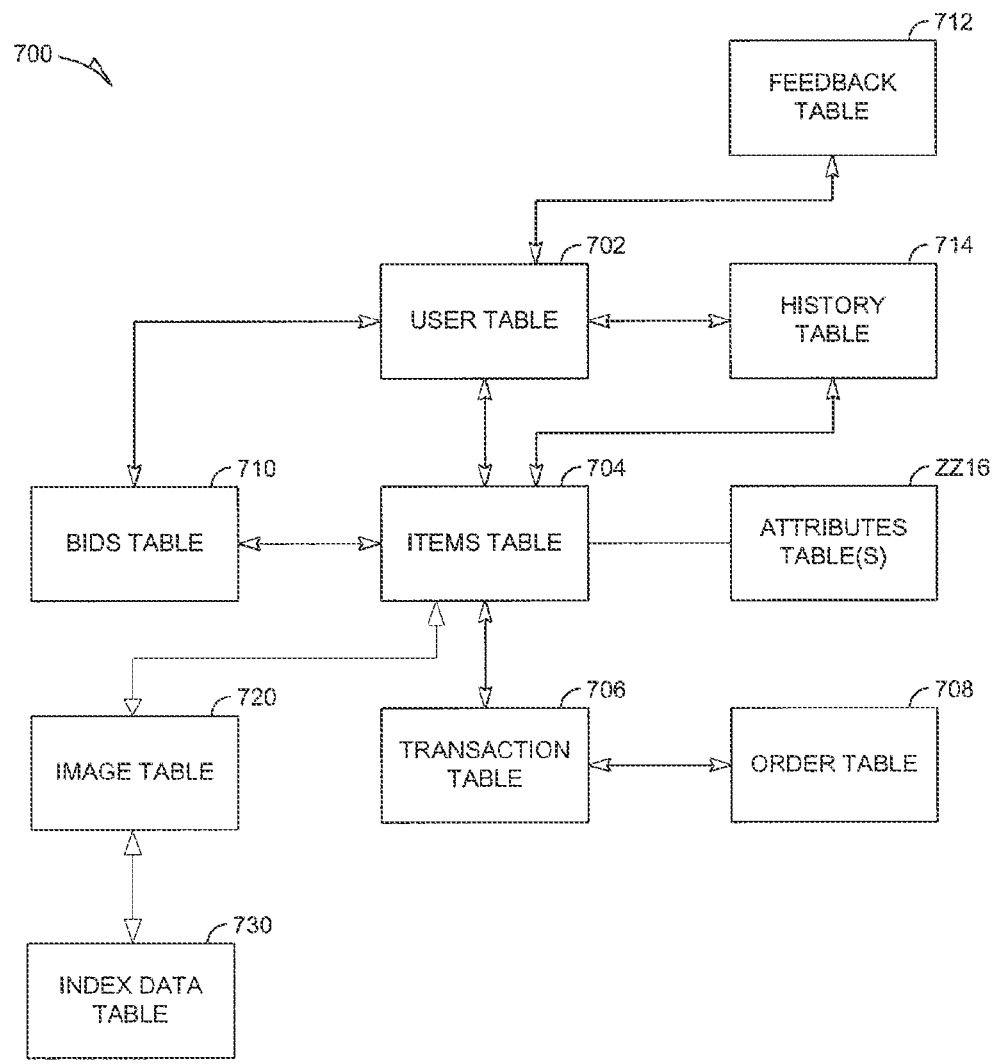
FIG. 11 is a diagrammatic view of a data structure according to an example embodiment of a network-based marketplace.

FIG. 11 is a high-level entity-relationship diagram of an example embodiment, illustrating various tables 700 that may be maintained within the databases 35 to 37, and that are utilized by and support the applications 30 and 32. A user table 702 contains a record for each registered user of the networked system 12, and may include identifier, address and financial instrument information pertaining to each such registered user. A user may operate as a seller, a buyer, or both, within the networked system 12. In one example embodiment, a buyer may be a user that has accumulated value (e.g., commercial or proprietary currency), and is accordingly able to exchange the accumulated value for items that are offered for sale by the networked system 12.

The tables 700 also include an items table 704 in which are maintained item records for goods and services that are available to be, or have been, transacted via the networked system 12. Each item record within the items table 704 may furthermore be linked to one or more user records within the user table 702, so as to associate a seller and one or more actual or potential buyers with each item record.

The items table 704 may be connected to an image table which contains images associated with the respective items or item listings in the items table 704. The image table 720 is in turn connected to an index data table 730 which contains index data as described in detail above.

A transaction table 706 contains a record for each transaction (e.g., a purchase or sale transaction) pertaining to items for which records exist within the items table 704.

An order table 708 is populated with order records, each order record being associated with an order. Each order, in turn, may be with respect to one or more transactions for which records exist within the transaction table 706.

Bid records within a bids table 710 each relate to a bid received at the networked system 12 in connection with an auction-format listing supported by an auction application 32. A feedback table 712 is utilized by one or more reputation applications 50, in one example embodiment, to construct and maintain reputation information concerning users. A history table 714 maintains a history of transactions to which a user has been a party. One or more attributes tables 716 record attribute information pertaining to items for which records exist within the items table 704. Considering only a single example of such an attribute, the attributes tables 716 may indicate a currency attribute associated with a particular item, the currency attribute identifying the currency of a price for the relevant item as specified in by a seller.

Figure 10:
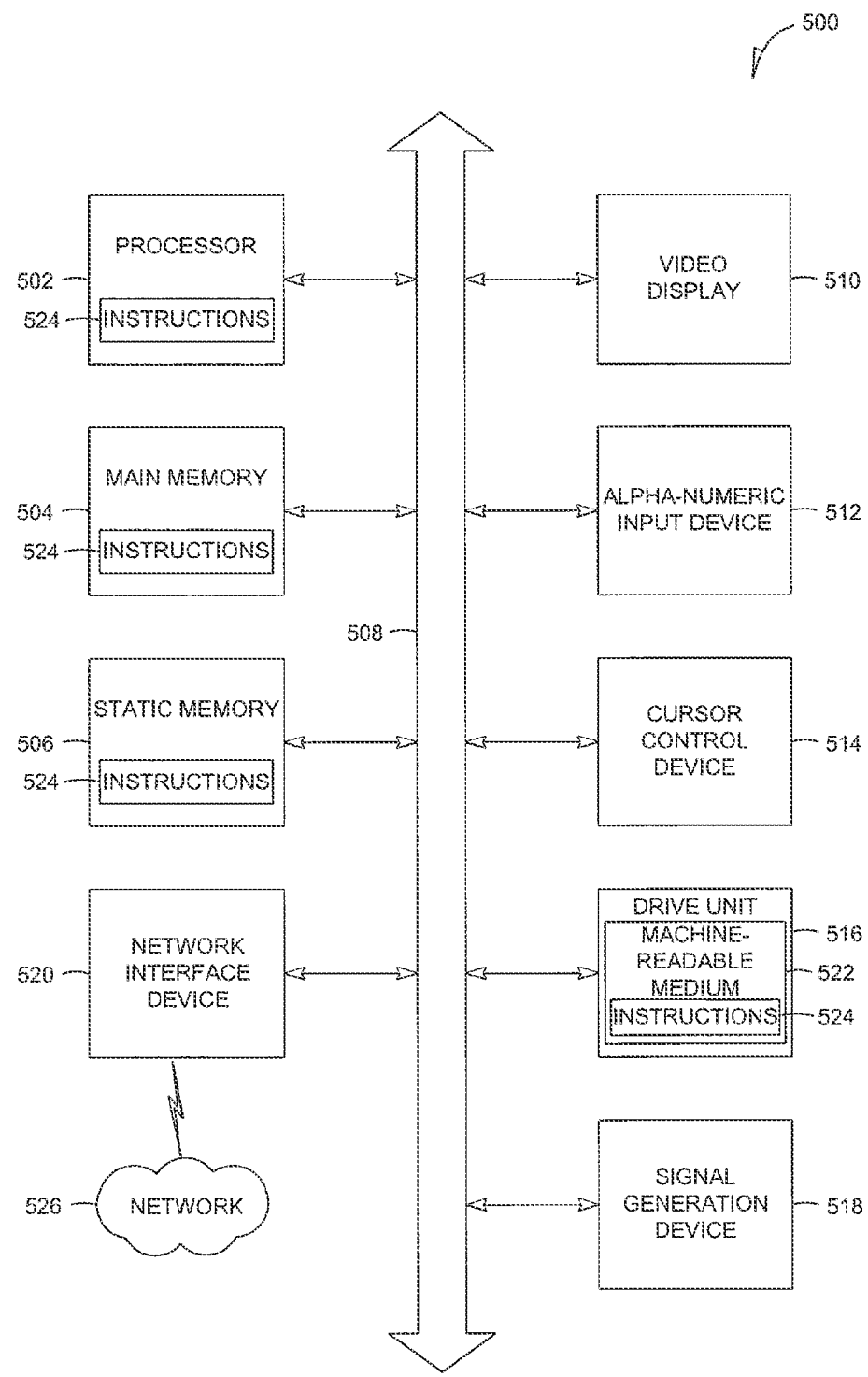
FIG. 10 is a block diagram of a machine in the example form of a computer system within which a set of instructions, for causing the machine to perform any one or more of the methodologies discussed herein, may be executed.

FIG. 10 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shalt accordingly be taken to include, but not be limited to, solid-state memories, optical and magnetic media, and carrier wave signals.

Thus, a method and system to index images and to perform an image-based search in a network-based marketplace have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a receiving module comprising one or more computer processors configured to access target image information representing a target image comprising a multiplicity of image pixels;
   a processing module comprising at least one computer processor configured for processing the target image information to generate multiple image vectors for the target image by performing operations comprising:
      partitioning the target image into a grid comprising multiple pixel blocks, each pixel block being made up by multiple contiguous image pixels of the target image, and the pixel blocks being substantially consistent in size and shape throughout;
      for each of the pixel blocks, assigning to the pixel block an index value based at least in part on intensity values of the image pixels making up the pixel block;
      identifying multiple image portions forming part of the grid, each image portion being made up by a plurality of contiguous pixel blocks forming part of the grid, the multiple image portions being substantially consistent in size and shape; and
      for each one of the multiple image portions, compiling a respective index vector comprising the index values of the corresponding plurality of pixel blocks making up the image portion;
   a comparison module comprising one or more processing devices configured to perform a similarity comparison between the target image and one or more candidate images based at least in part on the multiple image vectors of the target image; and
   a result module comprising at least one processing device configured to output on a computer device a comparison result based on results of the similarity comparison.

2. The system of claim 1, wherein the image portions are substantially similar in shape to the pixel blocks, but differ in size from the pixel blocks.

3. The system of claim 2, wherein the size of the image portions is a whole number multiple of the size of the pixel blocks, so that each image portion is completely made up by a whole number of pixel blocks.

4. The system of claim 2, wherein each image portion is made up by a square grid of pixel blocks.

5. The system of claim 1, wherein at least some of the multiple image portions overlap, with each pair of overlapping image portions sharing at least one pixel block in common.

6. The system of claim 5, wherein the processing module is configured such that the operations for generating the multiple image vectors comprise a sliding window method in which a sliding window defining the size and shape of the image portions is successively moved over a grid of the pixel blocks making up the target image, to identify each possible image portion consisting of a grid of pixel blocks fitting wholly within the sliding window.

7. The system of claim 1, wherein the processing module is configured to assign index values to the pixel blocks such that the index value for each pixel block corresponds to a statistical average of respective attribute values of the multiple image pixels of the pixel block.

8. The system of claim 1, wherein the assigning of a respective index value to each of the pixel blocks is based on an average of the light intensity values of the multiple image pixels of the pixel block.

9. The system of claim 1, wherein the processing module is configured to perform one or more preprocessing operations on the target image to provide a preprocessed target image, the multiple image vectors for the target image to be generated based on the preprocessed target image.

10. The system of claim 9, wherein the one or more preprocessing operations comprises an edge detection operation.

11. The system of claim 10 wherein the one or more preprocessing operations further comprises a normalizing operation performed after the edge detection operation.

12. A method comprising:
   accessing target image information representing a target image comprising a multiplicity of image pixels;
   in an automated operation using a processing module comprising at least one computer processor configured for processing target image information, processing the target image information to generate multiple image vectors for the target image by performing operations comprising:
      partitioning the target image into a grid comprising multiple pixel blocks, each pixel block being made up by multiple contiguous image pixels of the target image, and the pixel blocks being substantially consistent in size and shape throughout;
      for each of the pixel blocks, assigning to the pixel block an index value based at least in part on intensity values of the image pixels making up the pixel block;
      identifying multiple image portions forming part of the grid, each image portion being made up by a plurality of contiguous pixel blocks forming part of the grid, the multiple image portions being substantially consistent in size and shape; and
      for each one of the multiple image portions, compiling a respective index vector comprising the index values of the corresponding plurality of pixel blocks making up the image portion;
   performing an automated similarity comparison between the target image and one or more candidate images based at least in part on the multiple image vectors of the target image; and outputting to a computer device a comparison result based on results of the similarity comparison.

13. The method of claim 12, wherein each image portion comprises a two-dimensional area which is square in outline and is fully made up by a square grid of pixel blocks contained within the image portion.

14. The method of claim 12, wherein at least some of the multiple image portions overlap, with each pair of overlapping image portions sharing at least one pixel block in common.

15. The method of claim 14, wherein the processing of the target image information comprises performing a sliding window method in which a sliding window defining the size and shape of the image portions is successively moved over a grid of the pixel blocks making up the target image, to identify each possible image portion consisting of a grid of pixel blocks fitting wholly within the sliding window.

16. The method of claim 12, wherein the assigning of the index values to the pixel blocks is such that the index value for each pixel block corresponds to a statistical average of respective light intensity attribute values of the multiple image pixels of the pixel block.

17. The method of claim 12, further comprising performing one or more preprocessing operations on the target image to provide a preprocessed target image, the multiple image vectors for the target image to be generated based on the preprocessed target image.

18. The method of claim 17, wherein the one or more preprocessing operations comprises an edge detection operation.

19. The method of claim 18 wherein the one or more preprocessing operations further comprises a normalizing operation performed after the edge detection operation.

20. A non-transitory computer readable storage medium having stored thereon instructions for causing a machine, upon execution of the instructions by the machine, to perform operations comprising:
   accessing target image information representing a target image comprising a multiplicity of image pixels;
   in an automated operation using a processing module comprising at least one computer processor configured for processing target image information, processing the target image information to generate multiple image vectors for the target image by performing operations comprising:
      partitioning the target image into a grid comprising multiple pixel blocks, each pixel block being made up by multiple contiguous image pixels of the target image, and the pixel blocks being substantially consistent in size and shape throughout;
      for each of the pixel blocks, assigning to the pixel block an index value based at least in part on intensity values of the image pixels making up the pixel block;
      identifying multiple image portions forming part of the grid, each image portion being made up by a plurality of contiguous pixel blocks forming part of the grid, the multiple image portions being substantially consistent in size and shape; and
      for each one of the multiple image portions, compiling a respective index vector comprising the index values of the corresponding plurality of pixel blocks making up the image portion;
   performing an automated similarity comparison between the target image and one or more candidate images based at least in part on the multiple image vectors of the target image; and
   outputting to a computer device a comparison result based on results of the similarity comparison.

\* \* \* \* \*